United States Patent
Chen et al.

(10) Patent No.: US 12,021,982 B2
(45) Date of Patent: Jun. 25, 2024

(54) METHOD FOR PERFORMING SECURE BOOT BASED ON REDUNDANT CRYPTOGRAPHIC ALGORITHM AND DEVICE

(71) Applicant: Huawei Technologies Co., Ltd., Shenzhen (CN)

(72) Inventors: Haiwu Chen, Beijing (CN); Mengnan Zhang, Shenzhen (CN); Bin Cao, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 35 days.

(21) Appl. No.: 18/057,717

(22) Filed: Nov. 21, 2022

(65) Prior Publication Data

US 2023/0095143 A1    Mar. 30, 2023

Related U.S. Application Data

(63) Continuation of application No. PCT/CN2021/085909, filed on Apr. 8, 2021.

(30) Foreign Application Priority Data

May 22, 2020  (CN) .......................... 202010442242.1
Jul. 8, 2020   (CN) .......................... 202010652854.3

(51) Int. Cl.
*H04L 9/08*     (2006.01)
*G06F 21/57*    (2013.01)

(52) U.S. Cl.
CPC .......... *H04L 9/0891* (2013.01); *G06F 21/575* (2013.01); *H04L 9/0825* (2013.01); *G06F 2221/034* (2013.01)

(58) Field of Classification Search
CPC .............. G06F 1/32; G06F 1/12; H04L 9/082
See application file for complete search history.

(56) References Cited

U.S. PATENT DOCUMENTS

| | | | |
|---|---|---|---|
| 2011/0131420 A1 | 6/2011 | Ali et al. | |
| 2015/0058979 A1 | 2/2015 | Peeters et al. | |
| 2018/0004953 A1* | 1/2018 | Smith, II | H04L 9/3268 |
| 2021/0073388 A1* | 3/2021 | Spitz | H04L 9/14 |

FOREIGN PATENT DOCUMENTS

| | | |
|---|---|---|
| WO | 2017000237 A1 | 1/2017 |
| WO | 2021232982 A1 | 11/2021 |

* cited by examiner

*Primary Examiner* — Keshab R Pandey
(74) *Attorney, Agent, or Firm* — Slater Matsil, LLP

(57) ABSTRACT

This application discloses a method for performing secure boot based on a redundant cryptographic algorithm and a device. The method includes: obtaining first indication information and second indication information, and updating first baseline information based on the first indication information and the second indication information. The first indication information uniquely identifies a first cryptographic algorithm, the second indication information is used to instruct a network device to update the first cryptographic resource baseline information stored in a secure storage entity, and the first cryptographic resource baseline information is used to perform integrity verification on a first cryptographic resource used by the network device in a secure boot process.

20 Claims, 15 Drawing Sheets

Secure storage entity
(Cryptographic resource baseline information) — 120

Cryptographic resource baseline information 1

| ECC algorithm | |
|---|---|
| Enabling identification information 1 (unburned) | Suspension identification information 1 (unburned) |
| Public key baseline value 1 (unburned) | |

Cryptographic resource baseline information 2

| RSA algorithm | |
|---|---|
| Enabling identification information 2 (burned) | Suspension identification information 2 (unburned) |
| Public key baseline value 2 (which is written into a public key baseline value a) | |

Cryptographic resource baseline information 3

| SM2 algorithm | |
|---|---|
| Enabling identification information 3 (unburned) | Suspension identification information 3 (unburned) |
| Public key baseline value 3 (unburned) | |

Cryptographic resource baseline information 4

| SHA algorithm | |
|---|---|
| Enabling identification information 4 (unburned) | Suspension identification information 4 (unburned) |
| Public key baseline value 4 (unburned) | |

Cryptographic resource baseline information 5

| SM3 algorithm | |
|---|---|
| Enabling identification information 5 (unburned) | Suspension identification information 5 (unburned) |
| Public key baseline value 5 (unburned) | |

FIG 3A

Secure storage entity
(Cryptographic resource baseline information) 120

Cryptographic resource baseline information 1

| ECC algorithm ||
|---|---|
| Enabling identification information 1 (burned) | Suspension identification information 1 (unburned) |
| Public key baseline value 1 (which is written into a public key baseline value b) ||

Cryptographic resource baseline information 2

| RSA algorithm ||
|---|---|
| Enabling identification information 2 (burned) | Suspension identification information 2 (unburned) |
| Public key baseline value 2 (public key baseline value a) ||

Cryptographic resource baseline information 3

| SM2 algorithm ||
|---|---|
| Enabling identification information 3 (unburned) | Suspension identification information 3 (unburned) |
| Public key baseline value 3 (unburned) ||

Cryptographic resource baseline information 4

| SHA algorithm ||
|---|---|
| Enabling identification information 4 (unburned) | Suspension identification information 4 (unburned) |
| Public key baseline value 4 (unburned) ||

Cryptographic resource baseline information 5

| SM3 algorithm ||
|---|---|
| Enabling identification information 5 (unburned) | Suspension identification information 5 (unburned) |
| Public key baseline value 5 (unburned) ||

FIG 3B

Secure storage entity
(Cryptographic resource baseline information) 120

Cryptographic resource baseline information 1

| ECC algorithm ||
|---|---|
| Enabling identification information 1 (unburned) | Suspension identification information 1 (unburned) |
| Public key baseline value 1 (public key baseline value b) ||

Cryptographic resource baseline information 2

| RSA algorithm ||
|---|---|
| Enabling identification information 2 (burned) | Suspension identification information 2 (burned) |
| Public key baseline value 2 (public key baseline value a) ||

Cryptographic resource baseline information 3

| SM2 algorithm ||
|---|---|
| Enabling identification information 3 (unburned) | Suspension identification information 3 (unburned) |
| Public key baseline value 3 (public key baseline value c) ||

Cryptographic resource baseline information 4

| SHA algorithm ||
|---|---|
| Enabling identification information 4 (unburned) | Suspension identification information 4 (unburned) |
| Public key baseline value 4 (public key baseline value d) ||

Cryptographic resource baseline information 5

| SM3 algorithm ||
|---|---|
| Enabling identification information 5 (unburned) | Suspension identification information 5 (unburned) |
| Public key baseline value 5 (public key baseline value e) ||

FIG 3D

METHOD FOR PERFORMING SECURE BOOT BASED ON REDUNDANT CRYPTOGRAPHIC ALGORITHM AND DEVICE

CROSS-REFERENCE TO RELATED APPLICATIONS

This application is a continuation of International Application No. PCT/CN2021/085909, filed on Apr. 8, 2021, which claims priority to Chinese Patent Application No. 202010652854.3, filed on Jul. 8, 2020 and Chinese Patent Application No. 202010442242.1, filed on May 22, 2020. All of the aforementioned patent applications are hereby incorporated by reference in their entireties.

TECHNICAL FIELD

This application relates to the field of security technologies, and in particular, to a method for performing secure boot based on a redundant cryptographic algorithm and a device, and in particular, to a method for managing a cryptographic resource used by a network device in a secure boot process and a device.

BACKGROUND

To ensure security of a network device in a boot process, a secure boot technology is usually used for boot. The secure boot technology is an effective measure to protect software integrity during network device boot by using cryptography. In a secure boot process, a to-be-loaded image file of an application is first verified, and the image file of the application is loaded only after the verification succeeds. In this way, integrity and authority of the loaded image file of the application in the boot process are ensured.

Currently, a network device usually stores only one cryptographic algorithm used for secure boot, and verification is performed on a to-be-loaded image file of an application based on the cryptographic algorithm. The cryptographic algorithm is usually stored in a secure storage entity of the network device, and cannot be modified or updated. In this way, when only one cryptographic algorithm in the network device cannot satisfy a higher security requirement, or the cryptographic algorithm does not satisfy security requirements of some users, the network device cannot perform security protection on software integrity during boot by using a secure boot technology. Consequently, security of the network device is threatened.

SUMMARY

Based on this, embodiments of this application provide a method for performing secure boot based on a redundant cryptographic algorithm and a device, to securely update cryptographic resource baseline information, so that a network device can perform secure boot by flexibly using different cryptographic algorithms based on different security requirements. Therefore, security of the network device is ensured.

According to a first aspect, an embodiment of this application provides a method for managing a cryptographic resource used for secure boot. The method is implemented by a network device. For example, the method may include: obtaining first indication information and second indication information, and updating first cryptographic resource baseline information based on the first indication information and the second indication information. The first indication information uniquely identifies a first cryptographic algorithm, the second indication information is used to instruct the network device to update the first cryptographic resource baseline information stored in a secure storage entity, the first cryptographic resource baseline information is used to perform integrity verification on a first cryptographic resource used by the network device in a secure boot process, the first cryptographic resource corresponds to the first cryptographic algorithm and a first public key that are used by the network device when the network device performs secure boot, the first cryptographic resource baseline information includes status information of the first cryptographic algorithm, and the status information of the first cryptographic algorithm indicates a usage status of the first cryptographic algorithm. The first cryptographic algorithm may be any one of the following algorithms: an asymmetric cryptographic algorithm RSA, an elliptic curve cryptography (English: Elliptic Curve Cryptography, ECC for short) algorithm, a Chinese cryptographic asymmetric cryptographic algorithm SM2, a secure hash algorithm (English: Secure Hash Algorithm, SHA for short), or a cryptographic hash algorithm SM3. In this way, a plurality of types of cryptographic resource baseline information corresponding to a plurality of cryptographic algorithms are preset in the secure storage entity of the network device. In a process in which the network device runs in a live network, when a cryptographic algorithm needs to be updated, cryptographic resource baseline information corresponding to the cryptographic algorithm can be updated, so that status information of the cryptographic algorithm is changed to indicate that the cryptographic algorithm enters a different usage status. Therefore, the cryptographic algorithm used for secure boot is adjusted online based on different requirements, it is possible to adaptively perform secure boot based on different security requirements, and security of the network device is improved.

It should be noted that, in one case, the secure storage entity may be one-time programmable storage space in a processor; or in another case, the secure storage entity may be a security chip independent of a processor.

In a possible implementation, the second indication information is specifically used to instruct to enable the first cryptographic algorithm. In this case, for example, the updating first cryptographic resource baseline information may include: changing the status information of the first cryptographic algorithm, to set the usage status of the first cryptographic algorithm to an enabled state. For example, the setting the usage status of the first cryptographic algorithm to an enabled state may include: setting enabling identification information corresponding to the first cryptographic algorithm to indicate that the usage status of the first cryptographic algorithm is the enabled state. In one case, when the cryptographic resource baseline information is stored in the secure storage entity of the network device in a form of hardware burning, the updating first cryptographic resource baseline information based on the first indication information and the second indication information may include, for example, setting enabling identification information in the first cryptographic resource baseline information corresponding to the first cryptographic algorithm to the enabled state. In another case, when the cryptographic resource baseline information is securely stored in the network device in a form of software, the updating first cryptographic resource baseline information based on the first indication information and the second indication information may include, for example, setting a software status bit corresponding to the first cryptographic algorithm to the enabled state.

Updated first cryptographic resource baseline information further includes a first public key baseline value, and the first public key baseline value is used to perform integrity verification on the first public key. In a specific implementation, if the secure storage entity stores corresponding public key baseline values for the plurality of preset cryptographic algorithms, enabling the first cryptographic algorithm may also indicate enabling the first public key baseline value in the first cryptographic resource baseline information corresponding to the first cryptographic algorithm. In another specific implementation, for the plurality of preset cryptographic algorithms, if the secure storage entity stores only a public key baseline value corresponding to an enabled cryptographic algorithm, and space into which a corresponding public key baseline value is to be written is reserved in cryptographic resource baseline information corresponding to a cryptographic algorithm that is not enabled, the updating first cryptographic resource baseline information corresponding to a first cryptographic algorithm may further include: The network device obtains the first public key baseline value corresponding to the first cryptographic algorithm, and stores the first public key baseline value in the secure storage entity. For example, the first public key baseline value is written into a corresponding location, in the secure storage entity, of the first cryptographic resource baseline information corresponding to the first cryptographic algorithm. If the first indication information and the second indication information are carried in a first update file, and the first public key baseline value corresponding to the first cryptographic algorithm may also be carried in the first update file, that the network device obtains the first public key baseline value corresponding to the first cryptographic algorithm may be: The network device obtains the first public key baseline value from the first update file.

The first public key baseline value is a hash value of the first public key or plaintext of the first public key. The first public key baseline value uniquely corresponds to the first public key, and is used to perform integrity verification on the first public key. The first public key baseline value is used to verify integrity of the first public key carried in the first update file. In addition, when the first cryptographic algorithm is valid, in the secure boot process of the network device, the first public key baseline value is used to perform integrity verification on the first public key in the cryptographic resource stored in a nonvolatile memory. It should be noted that the nonvolatile memory may be, for example, a read-only memory (ROM), a programmable read-only memory (PROM), an electrically alterable read-only memory (EAROM), an erasable programmable read-only memory (EPROM), an electrically erasable programmable read-only memory (EEPROM), or a flash memory. This is not specifically limited in embodiments of this application.

For example, after the updating first cryptographic resource baseline information based on the first indication information and the second indication information, and before the secure boot, this embodiment of this application may further include: Updating a second cryptographic resource stored in the nonvolatile memory to the first cryptographic resource. In this case, this embodiment of this application may further include: performing secure boot based on the updated first cryptographic resource baseline information and the first cryptographic resource. For example, the secure boot process may include: performing, based on the updated first cryptographic resource baseline information, integrity verification on the updated first cryptographic resource stored in the nonvolatile memory; and if the integrity verification on the first cryptographic resource stored in the nonvolatile memory succeeds, verifying, based on the first public key and the first cryptographic algorithm in the first cryptographic resource, an image file, of an application, that is digitally signed by using a first private key and that is loaded in the secure boot process. For example, the performing, based on the updated first cryptographic resource baseline information, integrity verification on the updated first cryptographic resource stored in the nonvolatile memory may include: performing, by using the first public key baseline value, integrity verification on the first public key stored in the nonvolatile memory. In this way, in this embodiment, after the cryptographic algorithm satisfying the requirement is flexibly updated, secure boot can be performed based on the cryptographic algorithm satisfying the requirement, so that the security of the network device and use experience of the network device are improved.

For example, the obtaining first indication information and second indication information may include: obtaining the first update file, where the first update file carries the first indication information and the second indication information. To ensure integrity and authenticity of the first update file, the first update file may be, for example, a certificate. A format of the certificate can be customized or use the standard X.509 format (namely, a standard format of a public key certificate in cryptography). In addition, the first update file may alternatively be another file in any format that can carry the first indication information and the second indication information and that can be identified and parsed by the network device. The first update file is not specifically limited in embodiments of this application.

For example, the first update file is signed by using a second private key and a second cryptographic algorithm, the secure storage entity stores second cryptographic resource baseline information, the second cryptographic resource baseline information is used to perform integrity verification on the second cryptographic resource used by the network device in the secure boot process, and the second cryptographic resource corresponds to the second cryptographic algorithm and a second public key; and before performing secure boot by using the first cryptographic resource, the network device performs secure boot by using the second cryptographic resource. The first update file may further include the second public key. This embodiment of this application may further include: verifying a signature of the first update file based on the second cryptographic algorithm and the second public key. The second public key is a root public key of the network device; or the second public key is a public key derived based on a root key of the network device, for example, may be a secondary public key of the network device. It can be learned that when the verification on the first update file succeeds, it is considered that the first update file is not tampered with and is from a trusted source, it is determined that the first update file is reliable, and the cryptographic resource may be updated based on the first indication information and the second indication information in the first update file.

In a possible embodiment, a second public key baseline value is preset in the secure storage entity. In this way, before the verifying a signature of the first update file based on the second cryptographic algorithm and the second public key, this embodiment of this application may further include: performing, based on the second public key baseline value, integrity verification on the second public key carried in the first update file; and if the integrity verification on the second public key succeeds, verifying the signature of the first update file based on the second cryptographic algorithm and the second public key. Therefore, the security is higher.

In another possible embodiment, the first update file may further include device identification information of the network device, and the device identification information identifies the network device. For example, the device identification information of the network device includes any one of the following information: a chip identifier in the network device, a hardware identifier of the network device, an identifier of a user to which the network device belongs, an identifier of a manufacturer to which the network device belongs, an identifier of a domain to which the device belongs, an internet protocol (IP) address of the network device, a media access control (MAC) address of the network device, or an address of a network segment to which the network device belongs. In this case, after the verification on the first update file succeeds, matching verification may be further performed on the device identification information in the first update file and the network device. After the verification succeeds, it is determined that the first update file is a file that takes effect for the network device, and the method provided in this embodiment of this application is implemented based on the first update file, to update the cryptographic resource on the network device.

In some possible implementations, the secure storage entity further stores the second cryptographic resource baseline information, the second cryptographic resource baseline information is used to perform integrity verification on the second cryptographic resource used by the network device in the secure boot process, the second cryptographic resource corresponds to the second cryptographic algorithm and a second public key; and before performing secure boot by using the first cryptographic resource, the network device performs secure boot by using the second cryptographic resource. In this case, this embodiment of this application may further include: obtaining third indication information and fourth indication information, where the third indication information uniquely identifies the second cryptographic algorithm, and the fourth indication information indicates to suspend use of the second cryptographic algorithm. For example, the third indication information and the fourth indication information may be carried in the first update file. To be specific, the first indication information, the second indication information, the third indication information, and the fourth indication information are all carried in the first update file. For another example, the third indication information and the fourth indication information may alternatively be carried in a second update file. To be specific, the first indication information and the second indication information are carried in the first update file, and the third indication information and the fourth indication information are carried in the second update file. It should be noted that the second update file may be a certificate or another file in any format that can be identified and parsed by the network device. The second update file is not specifically limited in embodiments of this application.

In this implementation, this embodiment of this application may further include: suspending use of the second cryptographic algorithm based on the third indication information and the fourth indication information. For example, the suspending use of the second cryptographic algorithm may include: suspending use of the second cryptographic algorithm after updating the first cryptographic resource baseline information.

The suspending use of the second cryptographic algorithm may include: disabling the second cryptographic algorithm or revoking the second cryptographic algorithm. For example, the disabling the second cryptographic algorithm may include: setting a usage status of the second cryptographic algorithm to a disabled state; and for example, the revoking the second cryptographic algorithm may include: setting the usage status of the second cryptographic algorithm to a revoked state. For example, the setting the usage status of the second cryptographic algorithm to a revoked state may be specifically: setting revocation identification information corresponding to the second cryptographic algorithm to indicate that the usage status of the second cryptographic algorithm is the revoked state.

The second cryptographic algorithm may be any one of the following cryptographic algorithms: an asymmetric cryptographic algorithm RSA, an elliptic curve cryptography ECC algorithm, a Chinese cryptographic asymmetric cryptographic algorithm SM2, a secure hash algorithm SHA, or a cryptographic hash algorithm SM3, where the first cryptographic algorithm and the second cryptographic algorithm are different cryptographic algorithms.

In another possible implementation, the second indication information is specifically used to instruct the network device to suspend use of the first cryptographic algorithm. In this case, the updating the first cryptographic resource baseline information is specifically: changing the status information of the first cryptographic algorithm, to set the usage status of the first cryptographic algorithm to a suspended state. Suspending use of the first cryptographic algorithm may include: disabling the first cryptographic algorithm or revoking the first cryptographic algorithm. To disable the first cryptographic algorithm, the updating first cryptographic resource baseline information may include, for example, changing the status information of the first cryptographic algorithm, to set the usage status of the first cryptographic algorithm to the disabled state. To revoke the first cryptographic algorithm, the updating first cryptographic resource baseline information may include, for example, changing the status information of the first cryptographic algorithm, to set the usage status of the first cryptographic algorithm to the revoked state. For example, if the status information of the first cryptographic algorithm includes revocation identification information, the changing the status information of the first cryptographic algorithm, to set the usage status of the first cryptographic algorithm to the revoked state includes: setting the revocation identification information to set the usage status of the first cryptographic algorithm to the revoked state. In this way, in the foregoing embodiment, after enabling a new cryptographic algorithm and performing secure boot on the network device by using the newly enabled cryptographic algorithm, the network device can suspend a cryptographic algorithm that does not satisfy a requirement, so that the cryptographic algorithm that does not satisfy the requirement is not used for secure boot of the network device. Therefore, the security of the network device is improved.

According to a second aspect, an embodiment of this application further provides a secure boot method. The method is implemented by a network device. For example, the method may include: updating a first cryptographic algorithm used for secure boot to a second cryptographic algorithm, and updating a first public key baseline value used for secure boot to a second public key baseline value, so that integrity of a second public key is verified by using the second public key baseline value, where the second cryptographic algorithm and the second public key on which the integrity verification succeeds are used to verify an image file loaded in a secure boot process. The first cryptographic algorithm in a plurality of cryptographic algorithms may be any one of the following algorithms: an asymmetric cryptographic algorithm RSA, an elliptic curve cryptography ECC algorithm, a Chinese cryptographic asymmetric cryptographic algorithm SM2, a secure hash algorithm SHA, or a cryptographic hash algorithm SM3. The second cryptographic algorithm may be any one of the following algorithms: an RSA, an ECC algorithm, an SM2, an SHA, or an SM3. The first cryptographic algorithm and the second cryptographic algorithm are different. In this way, a plurality of cryptographic algorithms are preset in a secure storage entity of the network device. In a process in which the network device runs in a live network, when a new cryptographic algorithm needs to be used to perform secure boot, a cryptographic algorithm used for secure boot can be adjusted online by updating the cryptographic algorithm based on different requirements, so that it is possible to flexibly invoke, based on a different security requirement, a corresponding cryptographic algorithm to perform secure boot. Therefore, security of the network device is improved.

The secure storage entity that is in the network device and that is used to securely store cryptographic resource baseline information may be one-time programmable storage space in a processor; or the secure storage entity may be a security chip independent of a processor. The cryptographic resource baseline information may include first cryptographic resource baseline information and second cryptographic resource baseline information. The first cryptographic resource baseline information includes status information of the first cryptographic algorithm, and the status information of the first cryptographic algorithm indicates a usage status of the first cryptographic algorithm. Similarly, the second cryptographic resource baseline information includes status information of the second cryptographic algorithm, and the status information of the second cryptographic algorithm indicates a usage status of the second cryptographic algorithm. The first cryptographic resource baseline information is used to perform integrity verification on a first cryptographic resource used by the network device in the secure boot process, and the first cryptographic resource corresponds to the first cryptographic algorithm and a first public key that are used by the network device when the network device performs secure boot. Similarly, the second cryptographic resource baseline information is used to perform integrity verification on a second cryptographic resource used by the network device in the secure boot process, and the second cryptographic resource corresponds to the second cryptographic algorithm and a second public key that are used by the network device when the network device performs secure boot. In this way, in this embodiment of this application, after "updating a first cryptographic algorithm used for secure boot to a second cryptographic algorithm" and "updating a first public key baseline value used for secure boot to a second public key baseline value", integrity verification may be performed on the second cryptographic resource by using the second cryptographic resource baseline information, and then the image file loaded in the secure boot process is verified by using the second cryptographic resource on which the integrity verification succeeds.

For example, the updating a first cryptographic algorithm to a second cryptographic algorithm may include: suspending the first cryptographic algorithm and enabling the second cryptographic algorithm. The suspending the first cryptographic algorithm includes two possible meanings: revoking the first cryptographic algorithm or disabling the first cryptographic algorithm.

For example, this embodiment of this application may further include: If the integrity verification on the second public key succeeds, the network device may verify, by using the second public key and the second cryptographic algorithm, a signature of the image file loaded in the secure boot process.

In a specific implementation, for the plurality of preset cryptographic algorithms, if the secure storage entity stores corresponding public key baseline values, the second public key baseline value may be preset in the secure storage entity of the network device. In this case, that the second cryptographic algorithm is enabled indicates that the second public key baseline value in the second cryptographic resource baseline information corresponding to the second cryptographic algorithm is enabled.

In another specific implementation, for the plurality of preset cryptographic algorithms, if the secure storage entity stores only a public key baseline value corresponding to an enabled cryptographic algorithm, and space to which a corresponding public key baseline value is to be written is reserved in cryptographic resource baseline information corresponding to a cryptographic algorithm that is not enabled, the network device may further obtain the first public key baseline value corresponding to the first cryptographic algorithm. In this embodiment of this application, the updating a first cryptographic algorithm used for secure boot to a second cryptographic algorithm may include: obtaining the second public key baseline value, and storing the second public key baseline value in the secure storage entity of the network device. For example, a manner of obtaining the second public key baseline value may include: obtaining a first update file, where the first update file carries the second public key baseline value; and obtaining the second public key baseline value from the first update file. The second public key baseline value is stored in the secure storage entity of the network device. For example, the second public key baseline value is written into a corresponding location, in the secure storage entity, of the second cryptographic resource baseline information corresponding to the second cryptographic algorithm.

The second public key baseline value is a hash value of the second public key or plaintext of the second public key. The second public key baseline value uniquely corresponds to the second public key, and is used to perform integrity verification on the second public key. The second public key baseline value is used to verify integrity of the second public key carried in the first update file. In addition, when the second cryptographic algorithm is valid, in the secure boot process of the network device, the second public key baseline value is used to perform integrity verification on the second public key in the cryptographic resource stored in a nonvolatile memory.

For example, after the updating a first cryptographic algorithm used for secure boot to a second cryptographic algorithm, and before the secure boot, this embodiment of this application may further include: updating the first cryptographic resource that is used for secure boot and that is stored in the nonvolatile memory to the second cryptographic resource, where the second cryptographic resource includes the second public key. In this case, for example, the updating a first public key baseline value used for secure boot to a second public key baseline value may include: performing, by using the second public key baseline value, integrity verification on the second public key stored in the nonvolatile memory. If the integrity verification on the second cryptographic resource stored in the nonvolatile memory succeeds, signature verification is performed, based on the second public key and the second cryptographic algorithm, on an image file that is of an application and that is digitally signed by using a second private key. In this way, in this embodiment, after the cryptographic algorithm satisfying the requirement is flexibly updated, secure boot can be performed based on the cryptographic algorithm satisfying the requirement, so that the security of the network device and use experience of the network device are improved.

For example, the updating a first cryptographic algorithm used for secure boot to a second cryptographic algorithm may include: obtaining first indication information and second indication information, where the first indication information uniquely identifies the second cryptographic algorithm, and the second indication information is used to instruct the network device to enable the second cryptographic algorithm; and then enabling the second cryptographic algorithm based on the first indication information and the second indication information. For example, the enabling the second cryptographic algorithm may be: setting the usage status of the second cryptographic algorithm to an enabled state. The setting the usage status of the second cryptographic algorithm to an enabled state may include: setting enabling identification information corresponding to the second cryptographic algorithm to indicate that the usage status of the second cryptographic algorithm is the enabled state.

For example, the obtaining first indication information and second indication information may include: obtaining the first update file, where the first update file carries the first indication information and the second indication information. To ensure integrity and authenticity of the first update file, the first update file may be, for example, a certificate. A format of the certificate can be customized or use the standard X.509 format (namely, a standard format of a public key certificate in cryptography). In addition, the first update file may alternatively be another file in any format that can carry the first indication information and the second indication information and that can be identified and parsed by the network device. The first update file is not specifically limited in embodiments of this application.

For example, the first update file may be signed by using a first private key and the first cryptographic algorithm. Before performing secure boot by using the second cryptographic resource, the network device performs secure boot by using the first cryptographic resource, where the first cryptographic resource baseline information is used to perform integrity verification on a first cryptographic resource used by the network device in the secure boot process, and the first cryptographic resource corresponds to the first cryptographic algorithm and the first public key. The first update file may further include the first public key. This embodiment of this application may further include: verifying a signature of the first update file based on the first cryptographic algorithm and the first public key. The first public key is a root public key of the network device; or the first public key is a public key derived based on a root key of the network device, for example, a secondary public key of the network device. It can be learned that when the verification on the first update file succeeds, it is considered that the first update file is not tampered with and is from a trusted source, it is determined that the first update file is reliable, and the cryptographic resource may be updated based on the first indication information and the second indication information in the first update file.

If the first public key baseline value is preset in the secure storage entity of the network device, before the verifying a signature of the first update file based on the first cryptographic algorithm and the first public key, this embodiment of this application may further include: performing, based on the first public key baseline value, integrity verification on the first public key carried in the first update file; and if the integrity verification on the first public key succeeds, verifying the signature of the first update file based on the second cryptographic algorithm and the first public key. Therefore, the security is higher.

It is assumed that the first update file may further include device identification information of the network device, and the device identification information identifies the network device. For example, the device identification information of the network device includes any one of the following information: a chip identifier in the network device, a hardware identifier of the network device, an identifier of a user to which the network device belongs, an identifier of a manufacturer to which the network device belongs, an identifier of a domain to which the device belongs, an IP address of the network device, a MAC address of the network device, or an address of a network segment to which the network device belongs. In this case, after the verification on the first update file succeeds, matching verification may be further performed on the device identification information in the first update file and the network device. After the verification succeeds, it is determined that the first update file is a file that takes effect for the network device, and the method provided in this embodiment of this application is implemented based on the first update file, to complete the secure boot of the network device.

In some possible implementations, the first update file may further include third indication information and fourth indication information, where the third indication information uniquely identifies the first cryptographic algorithm, and the fourth indication information indicates to suspend use of the first cryptographic algorithm. Use of the first cryptographic algorithm is suspended based on the third indication information and the fourth indication information. An execution occasion for suspending use of the first cryptographic algorithm may be, for example, after the first cryptographic algorithm used for secure boot is updated to the second cryptographic algorithm.

In some other possible implementations, after the network device performs secure boot based on the second cryptographic algorithm and the second public key, this embodiment of this application may further include: obtaining third indication information and fourth indication information, where the third indication information uniquely identifies the first cryptographic algorithm, and the fourth indication information indicates to suspend use of the first cryptographic algorithm. For example, the third indication information and the fourth indication information may be carried in a second update file. In this case, the obtaining third indication information and fourth indication information may be obtaining the third indication information and the fourth indication information from the second update file. In this way, the network device may suspend use of the first cryptographic algorithm based on the third indication information and the fourth indication information. An execution occasion on which the network device suspends use of the first cryptographic algorithm may be, for example, after the first cryptographic algorithm used for secure boot is updated to the second cryptographic algorithm.

Suspending use of the first cryptographic algorithm may include: disabling the first cryptographic algorithm or revoking the first cryptographic algorithm. For example, the disabling the first cryptographic algorithm may include: setting the usage status of the first cryptographic algorithm to a disabled state; and for example, the revoking the first cryptographic algorithm may include: setting the usage status of the first cryptographic algorithm to a revoked state. For example, the setting the usage status of the first cryptographic algorithm to a revoked state may be specifically: setting revocation identification information corresponding to the first cryptographic algorithm to indicate that the usage status of the first cryptographic algorithm is the revoked state.

For example, this embodiment of this application may further include: obtaining the first update file, where the first update file indicates to enable the second cryptographic algorithm. For example, this embodiment of this application may further include: obtaining the second update file, where the second update file indicates to revoke the first cryptographic algorithm. In this case, for example, the updating a first cryptographic algorithm used for secure boot to a second cryptographic algorithm may include: enabling the second cryptographic algorithm based on the first update file; and revoking the first cryptographic algorithm based on the second update file. In this way, the cryptographic algorithm used for secure boot of the network device is flexibly adjusted, and the security of the network device is improved.

According to a third aspect, an embodiment of this application further provides a communication apparatus. The communication apparatus includes a transceiver unit and a processing unit. The transceiver unit is configured to perform receiving and sending operations implemented by the communication apparatus in the method according to the first aspect or the second aspect. The processing unit is configured to perform an operation other than the receiving and sending operations implemented by the communication apparatus in the method according to the first aspect or the second aspect. For example, when the communication apparatus performs the method implemented by the communication apparatus in the first aspect, the transceiver unit may be configured to obtain first indication information and second indication information; and the processing unit may be configured to update first cryptographic resource baseline information based on the first indication information and the second indication information. For another example, when the communication apparatus performs the method implemented by the communication apparatus in the second aspect, the transceiver unit may be configured to obtain first indication information and second indication information; and the processing unit may be configured to: update a first cryptographic algorithm used for secure boot to a second cryptographic algorithm, update a first public key baseline value used for secure boot to a second public key baseline value, and verify integrity of a second public key by using the second public key baseline value.

According to a fourth aspect, an embodiment of this application further provides a communication apparatus. The communication apparatus includes a communication interface and a processor. The communication interface is configured to perform receiving and sending operations implemented by the communication apparatus in the method according to any one of the first aspect, the possible implementations of the first aspect, the second aspect, or the possible implementations of the second aspect. The processor is configured to perform an operation other than the receiving and sending operations implemented by the communication apparatus in the method according to any one of the first aspect, the possible implementations of the first aspect, the second aspect, or the possible implementations of the second aspect.

According to a fifth aspect, an embodiment of this application further provides a communication apparatus. The communication apparatus includes a memory and a processor. The memory includes computer-readable instructions. The processor that communicates with the memory is configured to execute the computer-readable instructions, so that the communication apparatus is configured to perform the method according to any one of the first aspect, the possible implementations of the first aspect, the second aspect, or the possible implementations of the second aspect.

For the communication apparatuses provided in the foregoing aspects, for example, the communication apparatus includes a security chip independent of the processor or the processing unit, the security chip is connected to the processor or the processing unit, and the security chip is configured to store cryptographic resource baseline information. For another example, the processor or the processing unit of the communication apparatus includes one-time programmable storage space, and the one-time programmable storage space is used to store cryptographic resource baseline information.

According to a sixth aspect, an embodiment of this application further provides a security chip. The security chip includes a communication interface and a secure storage entity. The storage entity stores a plurality of types of cryptographic resource baseline information, a plurality of cryptographic resources respectively correspond to cryptographic algorithm information and key information that need to be used by a network device in a plurality of secure boot processes, each type of cryptographic resource baseline information corresponds one-to-one to each time of secure boot, and each type of cryptographic resource baseline information is used to perform integrity verification on a cryptographic resource used in each time of secure boot. The plurality of types of cryptographic resource baseline information include first cryptographic resource baseline information and second cryptographic resource baseline information, the first cryptographic resource baseline information is used to perform integrity verification on a first cryptographic resource used by the network device when the network device performs first secure boot, the first cryptographic resource corresponds to a first cryptographic algorithm and a first public key, the first cryptographic resource baseline information includes status information of the first cryptographic algorithm, and the status information of the first cryptographic algorithm indicates a usage status of the first cryptographic algorithm. The second cryptographic resource baseline information is used to perform integrity verification on a second cryptographic resource used by the network device when the network device performs second secure boot, the second cryptographic resource corresponds to a second cryptographic algorithm and a second public key, the second cryptographic resource baseline information includes status information of the second cryptographic algorithm, the status information of the second cryptographic algorithm indicates a usage status of the second cryptographic algorithm, the second secure boot is secure boot performed by the network device after the network device performs the first secure boot, and the first cryptographic algorithm is different from the second cryptographic algorithm.

The security chip communicates with a processor through the communication interface, and the processor is configured to manage the plurality of types of cryptographic resource baseline information stored in the security chip. The first cryptographic resource baseline information includes a first public key baseline value, and the first public key baseline value is used to verify integrity of the first public key; and the second cryptographic resource baseline information includes a second public key baseline value, and the second public key baseline value is used to verify integrity of the second public key.

It should be noted that the first cryptographic algorithm includes any two or more of the following cryptographic algorithms: an asymmetric cryptographic algorithm RSA, an elliptic curve cryptography ECC algorithm, a Chinese cryptographic asymmetric cryptographic algorithm SM2, a secure hash algorithm SHA, or a cryptographic hash algorithm SM3. The second cryptographic algorithm includes any two or more of the following cryptographic algorithms: an asymmetric cryptographic algorithm RSA, an elliptic curve cryptography ECC algorithm, an asymmetric cryptographic algorithm SM2, a secure hash algorithm SHA, or a cryptographic hash algorithm SM3.

The status information of the first cryptographic algorithm may include first suspension identification information. The first suspension identification information may include revocation identification information and/or disabling identification information. The status information of the first cryptographic algorithm may alternatively include first enabling identification information. Similarly, the status information of the second cryptographic algorithm may include second suspension identification information. The second suspension identification information may include revocation identification information and/or disabling identification information. The status information of the second cryptographic algorithm may alternatively include second enabling identification information.

According to a seventh aspect, an embodiment of this application further provides a computer-readable storage medium. The computer-readable storage medium stores instructions. When the instructions are run on a computer, the computer is enabled to perform the method according to any one of the first aspect, the possible implementations of the first aspect, the second aspect, or the possible implementations of the second aspect.

According to an eighth aspect, an embodiment of this application further provides a computer program product, including a computer program or computer-readable instructions. When the computer program is run or the computer-readable instructions are run on a computer, the computer is enabled to perform the method according to any one of the first aspect, the possible implementations of the first aspect, the second aspect, or the possible implementations of the second aspect.

BRIEF DESCRIPTION OF THE DRAWINGS

FIG. 3A is a schematic diagram of a structure of cryptographic resource baseline information before an ECC algorithm is enabled according to an embodiment of this application;

FIG. 3B is a schematic diagram of a structure of cryptographic resource baseline information after an ECC algorithm is enabled according to an embodiment of this application;

FIG. 3D is another schematic diagram of a structure of cryptographic resource baseline information before an ECC algorithm is enabled according to an embodiment of this application;

DETAILED DESCRIPTION OF ILLUSTRATIVE EMBODIMENTS

The following describes technical solutions of embodiments in this application with reference to accompanying drawings. A network architecture and a service scenario that are described in embodiments of this application are intended to describe the technical solutions in embodiments of this application more clearly, and do not constitute any limitation on the technical solutions provided in embodiments of this application. A person of ordinary skill in the art may know that, with evolution of the network architecture and emergence of a new service scenario, the technical solutions provided in embodiments of this application are also applicable to a similar technical problem.

Ordinal numbers such as "1", "2", "3", "first", "second", and "third" in this application are used to distinguish between a plurality of objects, but are not used to limit a sequence of the plurality of objects.

"A and/or B" mentioned in this application should be understood as including the following cases: Only A is included, only B is included, or both A and B are included.

Figure 1:
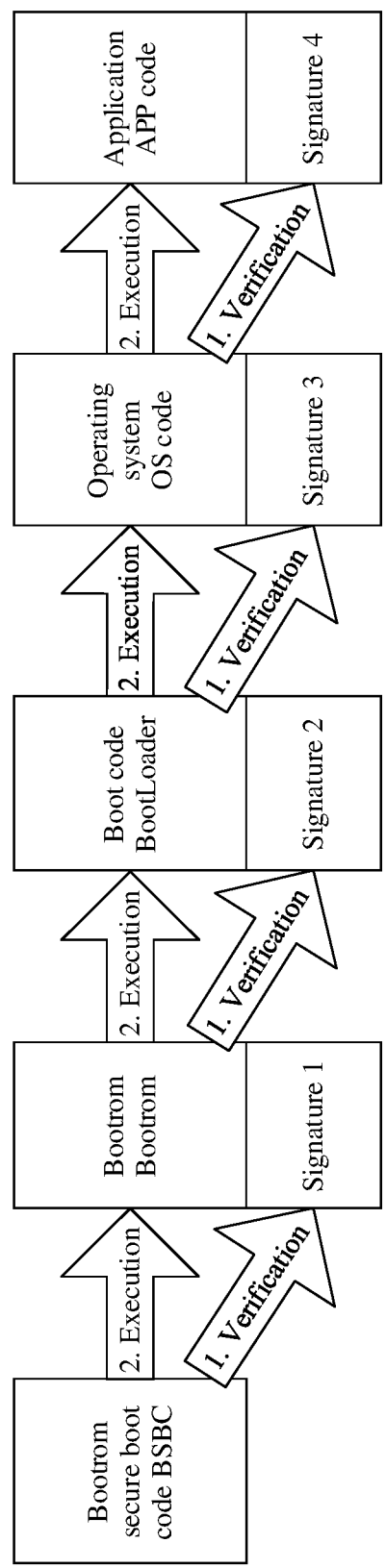
FIG. 1 is a schematic diagram of a secure boot process of a network device according to an embodiment of this application.

FIG. 1 is a schematic diagram of a secure boot process of a network device. Refer to FIG. 1. After being powered on, a network device first executes Bootrom secure boot code (BSBC), and then executes Bootrom; then loads an operating system (OS) by using boot code BootLoader, and specifically loads code corresponding to the OS such as Linux/VxWorks/Windows; and then loads a corresponding application (APP) after the OS is booted. To ensure security of a boot process of the network device, a trusted signature system (for example, a certificate authority (CA) server) is used to perform digital signature on an image file of each application. For example: Refer to FIG. 1. The signature system separately performs digital signature on Bootrom code, BootLoader code, OS code, and APP code by using a cryptographic algorithm 1, to obtain a signature 1 of the Bootrom code, a signature 2 of the BootLoader code, a signature 3 of the OS code, and a signature 4 of the APP code. It should be noted that because the BSBC may be considered as a root of trust (RoT) of the network device, digital signature does not need to be performed on the BSBC. For example, a secure boot process of the network device may include: After being powered on, the network device first executes BSBC, where the BSBC verifies the signature 1 of the Bootrom code by using a corresponding public key, and executes the Bootrom only after the verification succeeds; then, the Bootrom verifies the signature 2 of the BootLoader code by using a corresponding public key, and executes the BootLoader only after the verification succeeds; then, the BootLoader verifies the signature 3 of the OS code by using a corresponding public key, and boots the OS; and then, the OS verifies the signature 4 of the APP code by using a corresponding public key, and executes the APP after the verification succeeds. It should be noted that if any signature verification fails, it is determined that the secure boot fails this time.

An APP in a network device is used as an example to describe processes of performing digital signature and signature verification on APP code. The process of performing digital signature on the APP code may include: Before the APP code is delivered to the network device, a signature system first obtains a digital digest digest X1 of the APP code by using a hash algorithm, and then performs digital signature on the digest X1 by using a private key a to obtain digestEncode X1. When the APP code is delivered to the network device, the APP code and the digestEncode X1 are sent to the network device. The process of performing signature verification on the APP code may include: Before loading the APP code, the network device may first generate a digital digest digest X2 by using a hash algorithm that is the same as that used during the signature for the APP code, then perform signature verification on the digestEncode X1 by using a public key A to obtain digestDecode X3, and determine whether the digestDecode X3 and the digest X2 are the same. If the digestDecode X3 and the digest X2 are the same, it may be determined that the APP code is not tampered with and is released by an authorized manufacturer, so that it is ensured that the APP code to be loaded by the network device is secure and reliable. The private key a and the public key A are a pair of keys provided by a manufacturer of the network device. The public key A is publicly visible, and the private key a is confidential and visible only to a signature system corresponding to the manufacturer. It may be learned that, a digital signature technology may be considered as a combination of a digital digest technology and a public/private key technology. Whether a software package is tampered with may be verified by using the digital digest technology, and whether a digital digest is authority may be verified by using the public/private key technology. The digital signature technology is a technology that provides fast and comprehensive software integrity protection and verification for a secure boot process.

Figure 2A:
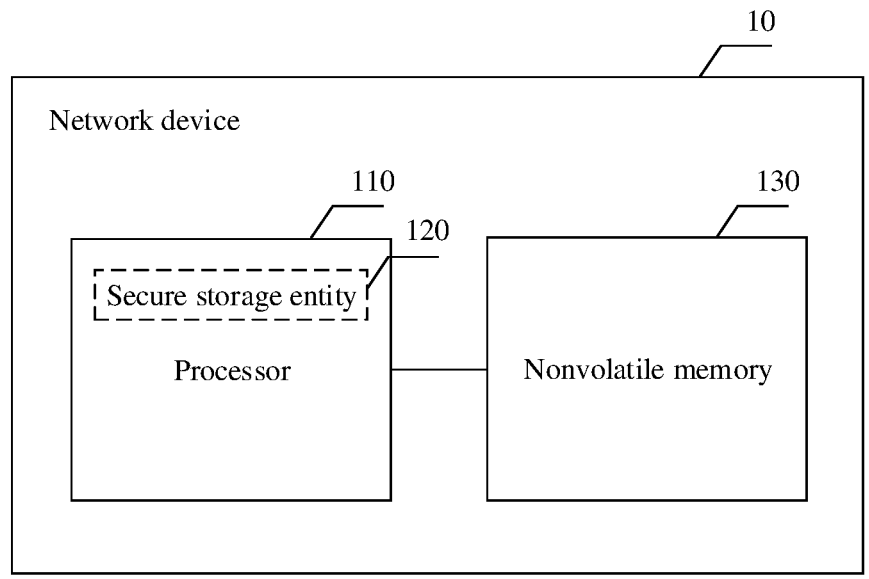
FIG. 2A is a schematic diagram of a structure of a network device 10 according to an embodiment of this application.
Figure 2B:
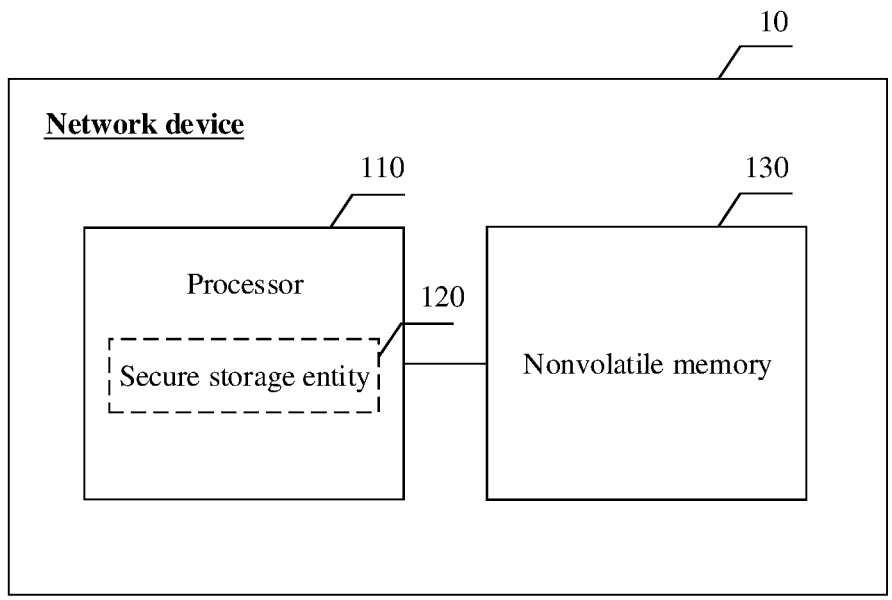
FIG. 2B is a schematic diagram of a structure of a network device 10 according to an embodiment of this application.

FIG. 2A and FIG. 2B are schematic diagrams of two structures of a network device 10. Refer to FIG. 2A. The network device 10 includes a processor 11o and a flash memory 130, and a secure storage entity 120 is integrated into the processor 110. A feature of the secure storage entity 120 is that content that is written into the secure storage entity 120 cannot be modified or erased. For example, the secure storage entity 120 is a one-time programmable (OTP) memory in the processor 110, and the OTP memory may implement a storage function by using electronic fuses (eFUSEs), to ensure high security. Refer to FIG. 2B. The network device 10 includes a processor 110, a secure storage entity 120, and a nonvolatile memory 130. The secure storage entity 120 is independent of the processor 110, and is configured to provide secure storage space. The secure storage entity 120 may be, for example, an independent security chip. The secure storage entity 120 and the processor 110 are in a communication connection. In FIG. 2A and FIG. 2B, the processor 110 is separately in communication connections to the secure storage entity 120 and the nonvolatile memory 130. The processor 110 is usually implemented by a chip having a control capability, for example, a central processing unit (CPU), a microprocessor unit (MPU), a microcontroller unit (English: Microcontroller Unit, MCU for short), or a field programmable gate array (FPGA), and is a start point of a trust chain in a boot process of the network device 10. Integrity of the processor 110 is strictly protected by hardware, so that it may be considered that the processor 110 is trustworthy in this embodiment of this application. The nonvolatile memory 130 is a nonvolatile memory, for example, may be a memory that has electronic erasable programmable performance and can quickly read data, so that data is not lost due to a power failure. The nonvolatile memory 130 may be configured to store data such as BootLoader code, OS code, and application code. The nonvolatile memory 130 includes but is not limited to a ROM, a PROM, an EAROM, an EPROM, an EEPROM, and a flash memory. An example in which the nonvolatile memory 130 is a flash memory 130 is used below for description.

Usually, a cryptographic algorithm and a public key baseline value corresponding to the cryptographic algorithm are preset inside the processor 110 of the network device 10. When the network device 10 is powered on, an image file that is of an application and that is stored in the flash memory 130 is loaded to a static random access memory (SRAM), and the unique cryptographic algorithm preset in the processor 110 is invoked based on cryptographic resource baseline information that corresponds to the cryptographic algorithm and that is preset in the secure storage entity 120 to verify the image file of the application, to complete secure boot. The cryptographic resource baseline information includes status information of the cryptographic algorithm and the public key baseline value corresponding to the cryptographic algorithm, and the public key baseline value may be plaintext of a public key or a hash value of the public key.

In consideration of security of a network device, a unique cryptographic algorithm and a public key baseline value that are used for secure boot are usually separately preset in the network device, and content of the unique cryptographic algorithm and the public key baseline value cannot be modified or updated online. However, in many cases, the unique cryptographic algorithm that is preset in the network device and that is used for secure boot may not satisfy a requirement. For example, with improvement of a computing capability of a processor in the network device or evolution of a cryptographic theory, security protection strength of the unique cryptographic algorithm preset in the network device is reduced, and effective security protection cannot be performed on a secure boot process of the network device. For another example, due to differences between security standards of users, the unique cryptographic algorithm preset in the network device may not satisfy requirements of security standards of some users. When a currently used cryptographic algorithm and a public key cannot satisfy a requirement, a network device or chip that has been delivered needs to be recalled for redesign. As a result, a series of problems such as a complex process, high costs, and poor user experience occur.

Based on this, an embodiment of this application provides a method for managing a cryptographic resource used for secure boot, so that a cryptographic algorithm used for secure boot can be adjusted online based on different requirements. In the technical solutions provided in embodiments of this application, cryptographic resource baseline information is prestored in a secure storage entity of a network device. The cryptographic resource baseline information includes a plurality of types of cryptographic resource baseline information, the plurality of types of cryptographic resource baseline information correspond one-to-one to a plurality of cryptographic algorithms, and each type of cryptographic resource baseline information includes status information of the corresponding cryptographic algorithm. For example, the plurality of cryptographic algorithms include a cryptographic algorithm 1 and a cryptographic algorithm 2, the cryptographic algorithm 1 corresponds to cryptographic resource baseline information 1, the cryptographic resource baseline information 1 includes status information of the cryptographic algorithm 1, and the status information of the cryptographic algorithm 1 indicates a usage status of the cryptographic algorithm 1; and the cryptographic algorithm 2 corresponds to cryptographic resource baseline information 2, the cryptographic resource baseline information 2 includes status information of the cryptographic algorithm 2, and the status information of the cryptographic algorithm 2 indicates a usage status of the cryptographic algorithm 2. The cryptographic resource baseline information 1 is used to perform integrity verification on a cryptographic resource 1 used by the network device in a secure boot process, and the cryptographic resource 1 corresponds to the cryptographic algorithm 1 and a public key B that are used by the network device when the network device performs secure boot. The cryptographic resource baseline information 2 is used to perform integrity verification on a cryptographic resource 2 used by the network device in the secure boot process, and the cryptographic resource 2 corresponds to the cryptographic algorithm 2 and a public key A that are used by the network device when the network device performs secure boot. Assuming that the network device needs to update the cryptographic resource, the network device may obtain indication information 1 and indication information 2, where the indication information 1 uniquely identifies the cryptographic algorithm 1, and the indication information 2 indicates the network device to update the cryptographic resource baseline information 1 stored in the secure storage entity. In this way, the network device may update, based on the indication information 1 and the indication information 2, the cryptographic resource baseline information 1 corresponding to the cryptographic algorithm 1. For example, the network device enables the cryptographic algorithm 1. For another example, the network device suspends the cryptographic algorithm 1. In this way, the plurality of types of cryptographic resource baseline information are preset in the secure storage entity of the network device. In a process in which the network device runs in a live network, when a cryptographic algorithm needs to be updated, cryptographic resource baseline information corresponding to the cryptographic algorithm can be updated, so that a usage status of the cryptographic algorithm is changed. Therefore, the cryptographic algorithm used for secure boot is adjusted online based on different requirements, it is possible to adaptively perform secure boot based on different security requirements, and security of the network device is improved.

In addition, an embodiment of this application provides a secure boot method, to implement, based on an online adjusted cryptographic algorithm, secure boot of a network device based on the cryptographic algorithm satisfying a security requirement. For example, a plurality of cryptographic algorithms prestored in a secure storage entity of the network device include a cryptographic algorithm 1 and a cryptographic algorithm 2. Assuming that the cryptographic algorithm 2 is currently used by the network device for secure boot, and the cryptographic algorithm 1 needs to be enabled as required to perform secure boot, the network device may update the cryptographic algorithm 2 used for secure boot to the cryptographic algorithm 1, update a public key baseline value a used for secure boot to a public key baseline value b, and then perform verification on integrity of a public key B by using the public key baseline value b, where the cryptographic algorithm 1 and the public key B on which the integrity verification succeeds are used to verify a signature of an image file loaded in a secure boot process. In this way, the plurality of cryptographic algorithms are preset in the secure storage entity of the network device. In a process in which the network device runs in a live network, when a new cryptographic algorithm needs to be used to perform secure boot, the cryptographic algorithm used for secure boot can be adjusted online by updating the cryptographic algorithm based on different requirements, so that it is possible to flexibly invoke, based on a different security requirement, a corresponding cryptographic algorithm to perform secure boot. Therefore, security of the network device is improved.

For example, the network device 10 shown in FIG. 2 is used as an example. Cryptographic resource baseline information is preset in the secure storage entity 120 of the network device 10. The cryptographic resource baseline information includes five types of cryptographic resource baseline information corresponding to five cryptographic algorithms, and each type of cryptographic resource baseline information includes two pieces of identification information and one public key baseline value. The five cryptographic algorithms are respectively an RSA algorithm, an ECC algorithm, an SM2 algorithm, an SHA algorithm, and an SM3 algorithm. The corresponding five types of cryptographic resource baseline information are as follows: cryptographic resource baseline information 1: enabling identification information 2, suspension identification information 2, and a public key baseline value 2 that correspond to the RSA algorithm; cryptographic resource baseline information 2: algorithm identification information 1, suspension identification information 1, and a public key baseline value 1 that correspond to the ECC algorithm; cryptographic resource baseline information 3: enabling identification information 3, suspension identification information 3, and a public key baseline value 3 that correspond to the SM2 algorithm 3; cryptographic resource baseline information 4: enabling identification information 4, suspension identification information 4, and a public key baseline value 4 that correspond to the SHA algorithm; and cryptographic resource baseline information 5: enabling identification information 5, suspension identification information 5, and a public key baseline value 5 that correspond to the SM3 algorithm. It should be noted that each piece of identification information cannot be modified once being burned. For example, if the enabling identification information 2 is burned, it indicates that a status of the RSA algorithm is an enabled state; or if the suspension identification information 2 is burned, it indicates that a status of the RSA algorithm is a suspended state. Only when enabling identification information corresponding to a cryptographic algorithm indicates the enabled state and suspension identification information indicates a non-suspended state, the cryptographic algorithm can be used as a valid cryptographic algorithm for secure boot. The flash memory 130 of the network device 10 stores a cryptographic resource, and the cryptographic resource may include at least a public key corresponding to a valid cryptographic algorithm. In addition, the flash memory 130 further includes an image file that is of an application and that is digitally signed by using a private key corresponding to the valid cryptographic algorithm.

Figure 3C:
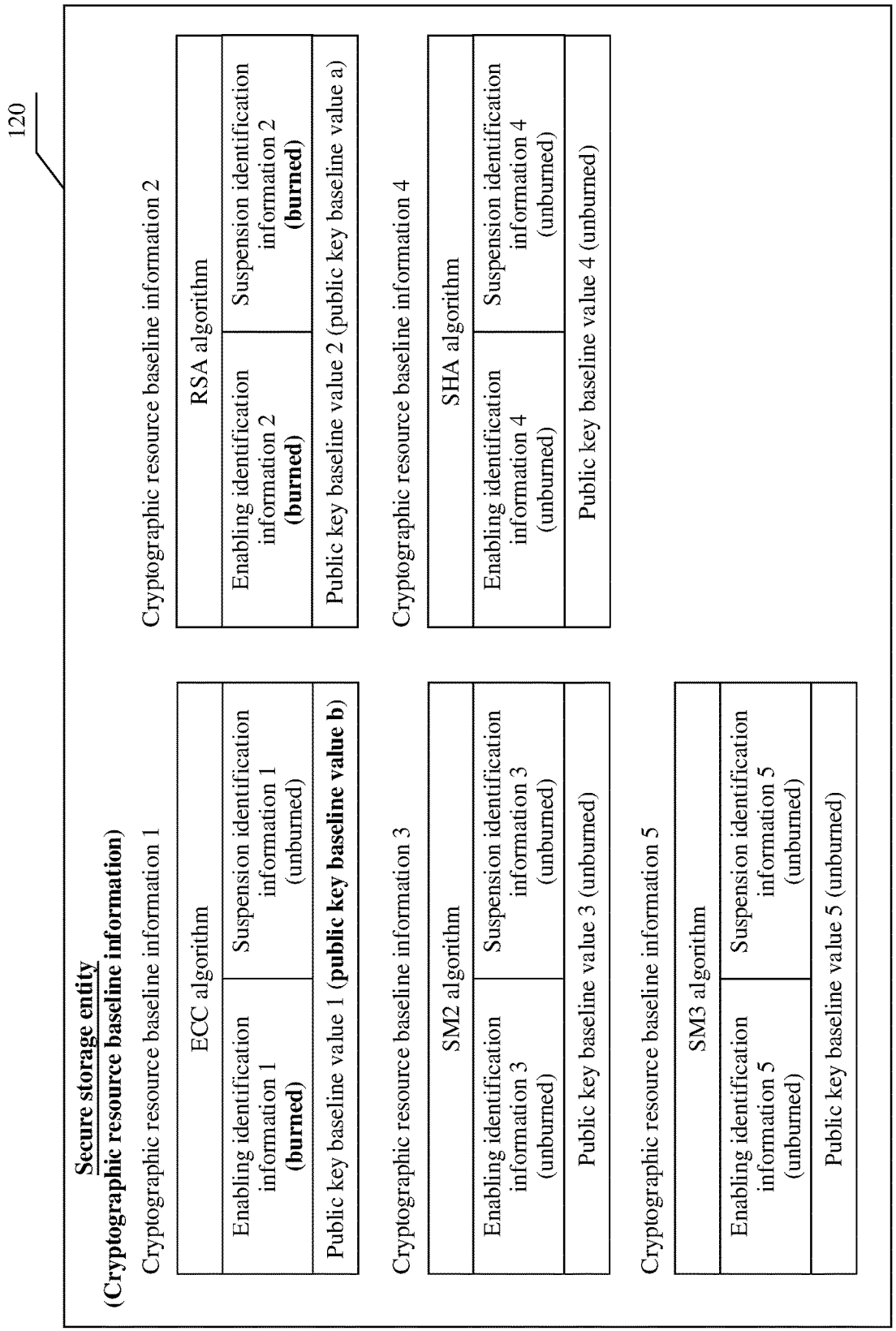
FIG. 3C is a schematic diagram of a structure of cryptographic resource baseline information after an RSA algorithm is revoked according to an embodiment of this application.

For example, it is assumed that the network device 10 is configured to use the RSA algorithm at delivery. For a structure of the cryptographic resource baseline information preset in the secure storage entity 120 of the network device 10, refer to FIG. 3A. The enabling identification information 2 is burned, a public key baseline value a is written into a location corresponding to the public key baseline value 2, and other identification information and another location corresponding to the public key baseline value are in to-be-burned states. After being powered on, the network device 10 may first perform, based on a valid RSA algorithm and the corresponding public key baseline value a in the secure storage entity 120, integrity verification on a cryptographic resource (including at least a public keyA corresponding to the RSA algorithm) stored in the flash memory 130, and a signature of an image file of an application is verified by using the cryptographic resource that is in the flash memory 130 and on which the verification succeeds. After the verification succeeds, the image file of the application is loaded, to complete secure boot of the network device 10. The public key baseline value a may be a hash value of the public key A or may be plaintext of the public key A, and the image file of the application is digitally signed by using a private key A corresponding to the public key A.

For another example, it is assumed that the network device 10 is configured to use the RSA algorithm at delivery. Based on a new requirement, a user needs to use the ECC algorithm to perform secure boot. In this case, the network device 10 obtains a certificate 1, and updates, based on the certificate 1, the cryptographic resource baseline information in the secure storage entity 120. For a structure of updated cryptographic resource baseline information, refer to FIG. 3B. In comparison with the structure shown in FIG. 3A, a difference lies in that the enabling identification information 1 is burned, and a public key baseline value b is written into a location corresponding to the public key baseline value 1. In addition, a cryptographic resource and an image file of an application in the flash memory 130 of the network device 10 are further updated. An updated cryptographic resource may include at least a public key B corresponding to the ECC algorithm, and an updated image file of the application is digitally signed by using a private key B corresponding to the public key B. After the updating is completed, the network device 10 reboots and may first perform, based on a valid ECC algorithm and the corresponding public key baseline value b in the secure storage entity 120, integrity verification on a cryptographic resource (including at least the public key B corresponding to the ECC algorithm) stored in the flash memory 130, and a signature of the image file of the application is verified by using the cryptographic resource that is in the flash memory 130 and on which the verification succeeds. After the verification succeeds, the image file of the application is loaded, to complete secure boot of the network device 10.

For still another example, it is assumed that after a cryptographic algorithm used by the network device 10 for secure boot is updated from the RSA algorithm to the ECC algorithm, when secure boot is successfully performed by using the ECC algorithm, to ensure security, the network device 10 may further suspend the invalid RSA algorithm. A specific process may include the following steps: A certificate 2 is obtained, and the network device 10 updates, based on the certificate 2, the cryptographic resource baseline information in the secure storage entity 120. For a structure of updated cryptographic resource baseline information, refer to FIG. 3C. In comparison with the structure shown in FIG. 3B, a difference lies in that the suspension identification information 2 is burned. In this way, the RSA algorithm in the secure storage entity 120 of the network device 10 is suspended, so that a rollback attack can be effectively avoided, to be specific, the replaced insecure or non-compliant cryptographic algorithm is effectively prevented from being used for secure boot. Therefore, security of the network device 10 is improved.

It can be learned that according to the technical solutions provided in embodiments of this application, cryptographic resource baseline information in a secure storage entity of a network device can be securely updated in a live network environment, so as to flexibly update, based on different security requirements, to obtain a cryptographic algorithm that satisfies a requirement. Therefore, secure boot is performed based on the cryptographic algorithm that satisfies the security requirement.

It should be noted that a process of updating the cryptographic resource baseline information in the secure storage entity in embodiments of this application is not described in detail in the foregoing examples. For specific implementation details, refer to related descriptions in the following embodiments shown in FIG. 4, FIG. 7, and FIG. 9 to FIG. 11.

It may be understood that, the scenario is merely a scenario example provided in embodiments of this application, but embodiments of this application are not limited to the scenario.

With reference to the accompanying drawings, the following describes in detail, by using embodiments, a specific implementation of a method for performing secure boot based on a redundant cryptographic algorithm in embodiments of this application.

A method for managing a cryptographic resource used for secure boot provided in embodiments of this application is applicable to a device such as a network device or a general-purpose embedded device. Using the network device as an example, the method may be performed by, for example, a processor in the network device. The processor in the network device is configured to perform the following method 100 or method 200, to manage a cryptographic resource.

In a secure storage entity of the network device, cryptographic resource baseline information includes a plurality of types of cryptographic resource baseline information, and the plurality of types of cryptographic resource baseline information correspond one-to-one to a plurality of cryptographic algorithms, to be specific, each type of cryptographic resource baseline information uniquely corresponds to one cryptographic algorithm, and each type of cryptographic resource baseline information includes status information of the uniquely corresponding cryptographic algorithm. The plurality of cryptographic algorithms may include at least a cryptographic algorithm 1 and a cryptographic algorithm 2. A plurality of types of cryptographic resource baseline information corresponding to the plurality of cryptographic algorithms may include at least cryptographic resource baseline information 1 and cryptographic resource baseline information 2. The cryptographic resource baseline information 1 includes status information 1 indicating a usage status of the cryptographic algorithm 1, and the cryptographic resource baseline information 2 includes status information 2 indicating a usage status of the cryptographic algorithm 2. The cryptographic resource baseline information 1 is used to perform integrity verification on a cryptographic resource 1 used by the network device in a secure boot process, and the cryptographic resource 1 corresponds to the cryptographic algorithm 1 and a public key B that are used by the network device when the network device performs secure boot. The cryptographic resource baseline information 2 is used to perform integrity verification on a cryptographic resource 2 used by the network device in the secure boot process, and the cryptographic resource 2 corresponds to the cryptographic algorithm 2 and a public key A that are used by the network device when the network device performs secure boot. In addition, each type of cryptographic resource baseline information may further include a public key baseline value corresponding to each of the plurality of cryptographic algorithms. In one case, the secure storage entity stores only a currently valid cryptographic algorithm and a public key baseline value corresponding to a suspended cryptographic algorithm, and reserves a storage area for a cryptographic algorithm that is not enabled and not suspended to store a corresponding public key baseline value. When the cryptographic algorithm is enabled, the corresponding public key baseline value may be written into the corresponding reserved storage area, so as to ensure effective secure boot. For example, for a structure of cryptographic resource baseline information, refer to FIG. 3A to FIG. 3C. In another case, in the secure storage entity, a corresponding public key baseline value is stored for each cryptographic algorithm, and a currently valid cryptographic algorithm and a public key baseline value corresponding to the cryptographic algorithm are used for secure boot. This corresponds to FIG. 3A. For example, for a structure of cryptographic resource baseline information in this case, refer to FIG. 3D.

Suspending the cryptographic algorithm may include two possible meanings: disabling the cryptographic algorithm and revoking the cryptographic algorithm. Disabling the cryptographic algorithm means that the cryptographic algorithm is temporarily set to an unavailable state, so that the cryptographic algorithm is temporarily not used for secure boot. However, the cryptographic algorithm may be re-enabled subsequently based on an actual requirement. Revoking the cryptographic algorithm means that use of the cryptographic algorithm is terminated, the cryptographic algorithm is permanently invalid in the network device, and the cryptographic algorithm cannot be re-enabled subsequently.

The cryptographic algorithm 1 may be, for example, any one of the following algorithms: an RSA algorithm, an ECC algorithm, an SHA algorithm, an SM3 algorithm, or an SM2 algorithm. The cryptographic algorithm 2 may be, for example, any one of the following cryptographic algorithms: an RSA algorithm, an ECC algorithm, an SHA algorithm, an SM3 algorithm, or an SM2 algorithm. The cryptographic algorithm 2 is different from the cryptographic algorithm 1.

Figure 4:
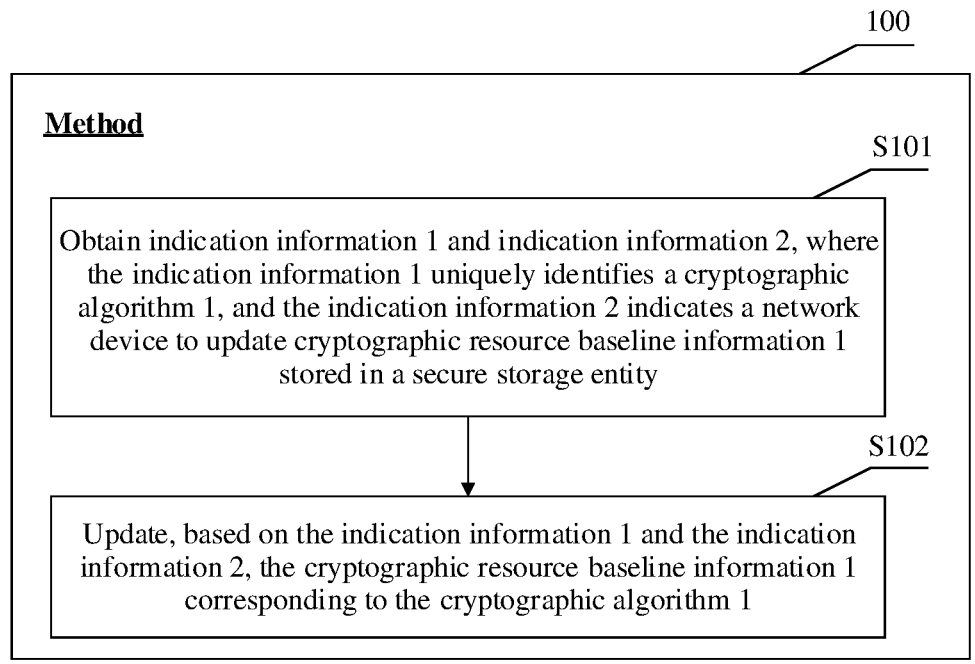
FIG. 4 is a schematic flowchart of a method 100 for managing a cryptographic resource used for secure boot according to an embodiment of this application.

FIG. 4 is a schematic flowchart of a method 100 for managing a cryptographic resource used for secure boot according to an embodiment of this application. Refer to FIG. 4. For example, the method 100 may include the following steps.

S101. Obtain indication information 1 and indication information 2, where the indication information 1 uniquely identifies a cryptographic algorithm 1, and the indication information 2 indicates a network device to update cryptographic resource baseline information 1 stored in a secure storage entity.

In a process in which the network device runs in a live network, if a user or a supplier needs to update the currently valid cryptographic algorithm 1 based on an actual requirement, the network device may obtain the indication information 1 and the indication information 2.

A manner in which the network device obtains the indication information 1 and the indication information 2 includes but is not limited to: Manner 1: The network device receives an update instruction sent by a user or a supplier, where the update instruction indicates to update the cryptographic resource baseline information 1, and the update instruction carries the indication information 1 and the indication information 2. For example, a user or a supplier sends a command line to the network device by using a network management system, where the command line indicates to update the cryptographic resource baseline information 1, and the command line carries the indication information 1 and the indication information 2. Manner 2: The network device obtains an update file 1, where the update file 1 includes the indication information 1 and the indication information 2. For example, the update file 1 may be generated by a device corresponding to a user or a supplier based on an actual requirement and sent to the network device. For another example, the update file 1 may alternatively be configured by a user or a supplier on the network device based on an actual requirement. Manner 3: The network device directly establishes a communication connection to a trusted authentication tool, where the authentication tool stores the indication information 1 and the indication information 2. Manner 4: The network device receives an update instruction sent by a user or a supplier, where the update instruction indicates to update the cryptographic resource baseline information 1. In response to the update instruction, the network device requests an update file 1 from a trusted device (for example, a certificate authority (English: Certificate Authority, CA for short) server), and the requested update file 1 includes the indication information 1 and the indication information 2.

In an example in which the indication information 1 and the indication information 2 are obtained by using the update file 1, a manner in which the network device obtains the update file 1 includes but is not limited to: Manner 1: The network device receives an update instruction sent by a user or a supplier, where the update instruction indicates to update the cryptographic resource baseline information 1, and the update instruction carries the update file 1. For example, the user or the supplier sends a command line to the network device by using a network management system, where the command line indicates to update the cryptographic resource baseline information 1, and the command line carries the update file 1. Manner 2: The network device receives an update instruction sent by a user or a supplier, where the update instruction indicates to update the cryptographic resource baseline information 1. In response to the update instruction, the network device requests the update file 1 from a trusted device (for example, a CA server). Manner 3: The network device directly establishes a communication connection to a trusted authentication tool, where the authentication tool stores the update file 1, and the authentication tool directly transmits the update file 1 to the network device.

A transfer protocol used by the network device to obtain the update file 1 or the update instruction includes but is not limited to the simple network management protocol (SNMP), the network configuration protocol (NETCONF), or a YANG model.

The indication information 1 uniquely identifies the cryptographic algorithm 1. In a specific implementation, a binary value of several bits may identify the indication information 1. For example, as shown in Table 1, a binary value corresponding to a 3-bit code may be used to represent different indication information 1. A correspondence between a code and a cryptographic algorithm shown in Table 1 is preset in a processor. In this way, the processor may determine, based on a specific binary value corresponding to the indication information 1, a cryptographic algorithm identified by the indication information 1. For example, as shown in the following Table 1, when the code is {0, 0, 0}, to be specific, when a binary value corresponding to the code is 0, the indication information 1 identifies an RSA algorithm. For another example, when the code is {0, 0, 1}, to be specific, when a binary value corresponding to the code is 1, the indication information 1 identifies an ECC algorithm. In another specific implementation, the indication information 1 may alternatively be represented in a bit mapping manner. For example, as shown in Table 2, codes of eight bits may be set to represent different indication information 1, and each bit corresponds one-to-one to each cryptographic algorithm. A correspondence between a bit and a cryptographic algorithm is preset in the processor. In this way, the processor may determine, based on a bit corresponding to the indication information 1, a cryptographic algorithm identified by the indication information 1. For example, as shown in the following Table 2, when the indication information 1 is 00000001, that is, when a least significant bit of preset bits is 1, the indication information uniquely identifies an RSA algorithm. For another example, when the indication information 1 is 00000010, that is, when a second least significant bit of preset bits is 1, the indication information uniquely identifies an ECC algorithm.

TABLE 1

Correspondence between a code and a cryptographic algorithm

| Cryptographic algorithm name | Code | Descriptions |
| --- | --- | --- |
| RSA algorithm | 000 | Asymmetric cryptographic algorithm RSA |
| ECC algorithm | 001 | Elliptic curve cryptography ECC algorithm |
| SM2 algorithm | 010 | Chinese asymmetric cryptographic algorithm SM2 |

TABLE 2

Correspondence between a bit and a cryptographic algorithm

| Cryptographic algorithm name | Code | Descriptions |
| --- | --- | --- |
| RSA algorithm | 00000001 | Asymmetric cryptographic algorithm RSA |
| ECC algorithm | 00000010 | Elliptic curve cryptography ECC algorithm |
| SM2 algorithm | 00000100 | Chinese asymmetric cryptographic algorithm SM2 |

The indication information 2 indicates the network device to update the cryptographic resource baseline information 1 stored in the secure storage entity. Updating the cryptographic resource baseline information 1 has two possible meanings: enabling the cryptographic algorithm 1 identified by the indication information 1 or suspending the cryptographic algorithm 1. For example, the indication information 2 may indicate to enable the cryptographic algorithm 1. For another example, the indication information 2 may alternatively indicate to suspend the cryptographic algorithm 1.

An example in which the update file 1 carries the indication information 2 is used to describe how to obtain the indication information 2. In a specific example, different meanings of the indication information 2 may be indicated by using a value of a specific field in the update file 1. For example, the indication information 2 may be a field that is in the update file 1 and that indicates a file type. When a value of the field that is in the update file 1 and that indicates the file type is 1, it indicates that the update file 1 is an enabling file. In this case, the indication information 2 indicates to enable the cryptographic algorithm 1. When a value of the field that is in the update file 1 and that indicates the file type is 0, it indicates that the update file 1 is a suspension file. In this case, the indication information 2 indicates to suspend the cryptographic algorithm 1. In another specific example, the indication information 2 may alternatively be a separate field in the update file 1. For example, a specific meaning of the indication information 2 may be indicated by using a binary value or a bit mapping manner.

In some possible implementations, when the update file 1 is an enabling file, assuming that a currently valid cryptographic algorithm is a cryptographic algorithm 2, in addition to the indication information 1 and the indication information 2, the update file 1 may further include a public key A and a signature X. The signature X is obtained after the update file 1 is digitally signed by using a private key A and the cryptographic algorithm 2. In addition, the update file 1 may further carry an identifier of the currently valid cryptographic algorithm 2, where the identifier is used to verify the update file 1.

During specific implementation, after the network device receives the update file 1, a verification process performed by the network device may include: S11: Obtain, based on the identifier that is of the cryptographic algorithm 2 and that is in the update file 1, cryptographic resource baseline information 2 that corresponds to the cryptographic algorithm 2 and that is in the cryptographic resource baseline information. S12: Determine, based on enabling identification information 2 and suspension identification information 2 in the cryptographic resource baseline information 2, that the cryptographic algorithm 2 is an enabled and non-suspended valid cryptographic algorithm. S13: The network device obtains a public key baseline value a in the cryptographic resource baseline information 2 corresponding to the cryptographic algorithm 2, and performs integrity verification on the public key A in the update file 1 by using the public key baseline value a. S14: The network device verifies the signature X by using the cryptographic algorithm 2 and the public key A on which the verification succeeds. S15: If the verification on the signature X succeeds, the network device determines that the update file 1 is complete and trustworthy. In this way, the following S102 may be performed. For example, the enabling identification information 1 in the cryptographic resource baseline information 1 corresponding to the cryptographic algorithm 1 is set to an enabled state based on the indication information 1 and the indication information 2 in the update file 1.

It should be noted that the public key A in the update file 1 may be a root public key of the network device. Alternatively, to reduce a quantity of times of exposing a root private key, improve security and reliability of the network device, and save storage resources in the secure storage entity, the public key A in the update file 1 may alternatively be a public key derived by the network device based on the root public key, for example, a secondary public key of the network device. The root public key is a primary public key, and the secondary public key is a result obtained by processing the root public key by using a secure hash algorithm (English: Secure Hash Algorithm, SHA for short) (for example, SHA256).

The public key baseline value a prestored in the secure storage entity of the network device uniquely corresponds to the public key A, and is used to perform integrity verification on the public key A. The public key baseline value a may be, for example, plaintext of the public key A or a hash value of the public key A. The public key baseline value a is used to verify integrity of the public keyA carried in the update file 1. In addition, when the cryptographic algorithm 2 is valid, in a secure boot process of the network device, the public key baseline value a is used to perform integrity verification on the public key A in a cryptographic resource stored in a flash (flash) memory.

In addition, to improve security, the update file 1 may further include device identification information of the network device, where the device identification information identifies the network device. For example, the device identification information of the network device includes any one of the following information: a chip identifier in the network device, a hardware identifier of the network device, an identifier of a user to which the network device belongs, an identifier of a manufacturer to which the network device belongs, an identifier of a domain to which the device belongs, an IP address of the network device, a MAC address of the network device, or an address of a network segment to which the network device belongs. In this case, for example, S15 in the verification process performed by the network device after the network device receives the update file 1 may include: after the verification on the signature X succeeds, obtaining the device identification information of the network device from the update file 1, and performing matching verification on the device identification information. If the device identification information of the network device matches the network device, it is considered that the update file 1 is trustworthy; otherwise, it is considered that the update file 1 is not trustworthy, and S102 is not performed.

In a specific implementation, after S15 and before S102, this embodiment of this application may further include: S16: Obtain the cryptographic resource baseline information 1 that corresponds to the cryptographic algorithm 1 and that is in the cryptographic resource baseline information. S17: Determine, based on the enabling identification information 1 and the suspension identification information 1 in the cryptographic resource baseline information 1, that the cryptographic algorithm 1 is a not enabled and not suspended cryptographic algorithm. In this way, it is ensured that the cryptographic resource baseline information 1 corresponding to the to-be-enabled cryptographic algorithm 1 is in a state in which the cryptographic resource baseline information 1 can be updated, and reliable verification is performed to perform the following S102.

In some other possible implementations, when the update file 1 is a suspension file, assuming that a currently valid cryptographic algorithm is the cryptographic algorithm 1, in addition to the indication information 1 and the indication information 2, the update file 1 may further include a public key B and a signature Y. The signature Y is obtained after the update file 1 is digitally signed by using the private key B and the cryptographic algorithm 1. In addition, the update file 1 may further carry an identifier of the currently valid cryptographic algorithm 1, where the identifier is used to verify the update file 1.

During specific implementation, after the network device receives the update file 1, a verification process performed by the network device may include: S21: Obtain, based on the identifier that is of the cryptographic algorithm 1 and that is in the update file 1, the cryptographic resource baseline information 1 that corresponds to the cryptographic algorithm 1. S22: Determine, based on enabling identification information 1 and suspension identification information 1 in the cryptographic resource baseline information 1, that the cryptographic algorithm 1 is an enabled and non-suspended valid cryptographic algorithm. S23: The network device obtains a public key baseline value b in the cryptographic resource baseline information 1 corresponding to the cryptographic algorithm 1, and performs integrity verification on the public key B in the update file 1 by using the public key baseline value b. S24: The network device verifies the signature Y by using the cryptographic algorithm 1 and the public key B on which the verification succeeds. S25: If the verification on the signature Y succeeds, the network device determines that the update file 1 is complete and trustworthy. In this way, the following S102 may be performed. For example, the suspension identification information 1 in the cryptographic resource baseline information 1 corresponding to the cryptographic algorithm 1 is set to a suspended state based on the indication information 1 and the indication information 2 in the update file 1.

It should be noted that the public key B in the update file 1 may be a root public key of the network device or a public key derived by the network device based on a root public key.

The public key baseline value b prestored in the secure storage entity of the network device uniquely corresponds to the public key B, and is used to perform integrity verification on the public key A. The public key baseline value b may be, for example, plaintext of the public key B or a hash value of the public key B. The public key baseline value b is used to verify integrity of the public key B carried in the update file 1. In addition, when the cryptographic algorithm 1 is valid, in a secure boot process of the network device, the public key baseline value b is used to perform integrity verification on the public key B in a cryptographic resource stored in a flash (flash) memory.

In addition, to improve security, the update file 1 may further include device identification information of the network device, where the device identification information identifies the network device. In this case, for example, S25 in the verification process performed by the network device after the network device receives the update file 1 may include: after the verification on the signature Y succeeds, obtaining the device identification information of the network device from the update file 1, and performing matching verification on the device identification information. If the device identification information of the network device matches the network device, it is considered that the update file 1 is trustworthy; otherwise, it is considered that the update file 1 is not trustworthy, and S102 is not performed.

Figure 5A:
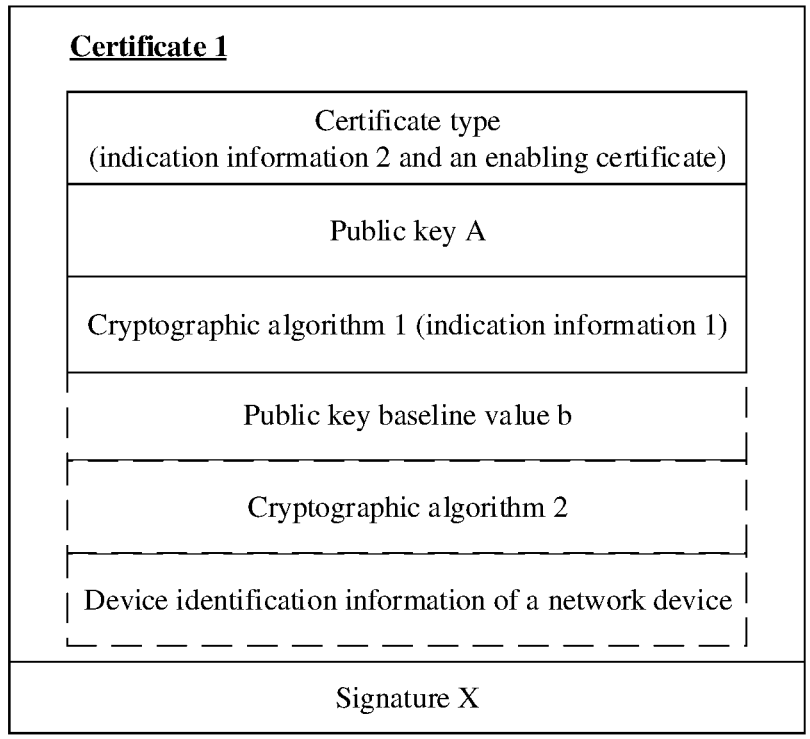
FIG. 5A is a schematic diagram of a structure of a certificate 1 according to an embodiment of this application.
Figure 5B:
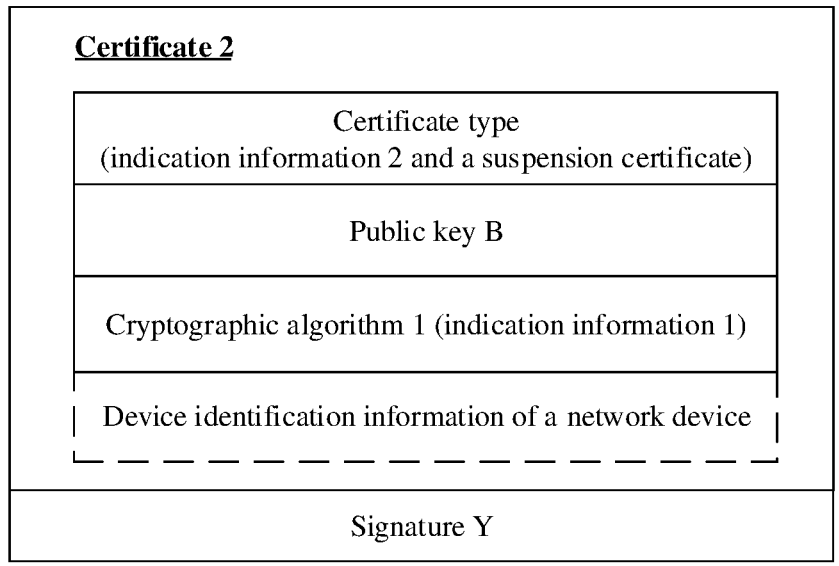
FIG. 5B is a schematic diagram of a structure of a certificate 2 according to an embodiment of this application.

To ensure integrity and authenticity of the update file 1, the update file 1 may be, for example, a certificate. As shown in FIG. 5A, a certificate 1 that enables the cryptographic algorithm 1 may carry, for example, a certificate type, the public key A, the cryptographic algorithm 1, and the signature X. In addition, the certificate 1 may further carry the public key baseline value b, the cryptographic algorithm 2, and the device identification information of the network device. The certificate type may be used as the indication information 2, to indicate that the certificate 1 is an enabling certificate. The cryptographic algorithm 1 may be, for example, 001 or 00000010, used as the indication information 1, to indicate an ECC algorithm. As shown in FIG. 5B, a certificate 2 used to suspend the cryptographic algorithm 1 may carry, for example, a certificate type, the cryptographic algorithm 1, the public key B, and the signature Y. In addition, the certificate 2 may further carry the device identification information of the network device. The certificate type may be used as the indication information 2, to indicate that the certificate 2 is a suspension certificate. The cryptographic algorithm 1 may be, for example, 000 or 00000001, used as the indication information 1, to indicate an RSA algorithm. It should be noted that formats of the certificate 1 and the certificate 2 can be customized or use the standard X.509 format (namely, a standard format of a public key certificate in cryptography).

It should be noted that a form of the update file 1 is not specifically limited in this embodiment of this application. A file in any form may be used as the update file 1 provided that the file can carry the indication information 1 and the indication information 2.

S102: Update, based on the indication information 1 and the indication information 2, the cryptographic resource baseline information 1 corresponding to the cryptographic algorithm 1.

For example, if the indication information 2 indicates to enable the cryptographic algorithm 1, the network device may set a usage status of the cryptographic algorithm 1 to the enabled state based on the indication information 2. When the cryptographic resource baseline information is stored in the secure storage entity of the network device in a form of hardware burning, for example, S102 may include: setting the enabling identification information 1 in the cryptographic resource baseline information 1 to indicate that the usage status of the cryptographic algorithm 1 is the enabled state. In another case, when the cryptographic resource baseline information is securely stored in the network device in a form of software, for example, S102 may include: setting a software state bit corresponding to the cryptographic algorithm 1 to the enabled state. In a specific implementation, if the secure storage entity stores corresponding public key baseline values for a plurality of preset cryptographic algorithms, enabling the cryptographic algorithm 1 may alternatively indicate enabling the public key baseline value b in the cryptographic resource baseline information 1 corresponding to the cryptographic algorithm 1. In another specific implementation, for a plurality of preset cryptographic algorithms, if the secure storage entity stores only a public key baseline value corresponding to an enabled cryptographic algorithm, and space into which a corresponding public key baseline value is reserved in cryptographic resource baseline information corresponding to a cryptographic algorithm that is not enabled, for example, the updating the cryptographic resource baseline information 1 in S102 may include: obtaining, by the network device, the public key baseline value b corresponding to the cryptographic algorithm 1, and storing the public key baseline value b in the secure storage entity. For example, the public key baseline value b is written into a location, in the secure storage entity, corresponding to the public key baseline value 1 of the cryptographic resource baseline information 1 corresponding to the cryptographic algorithm 1. If the indication information 1 and the indication information 2 are carried in the update file 1, and the public key baseline value b corresponding to the cryptographic algorithm 1 may also be carried in the update file 1, that the network device obtains the public key baseline value b corresponding to the cryptographic algorithm 1 may be: The network device obtains the public key baseline value b from the update file 1.

For example, it is assumed that the cryptographic algorithm 2 is an RSA algorithm, and the cryptographic algorithm 1 is an ECC algorithm. Before the method 100 is performed, for a format of the cryptographic resource baseline information, refer to FIG. 3A. After the method 100 is performed, for a format of the cryptographic resource baseline information, refer to FIG. 3B.

When the cryptographic resource baseline information is updated, or after the cryptographic resource baseline information is updated, the cryptographic resource in the flash memory and an image file of an application may also be correspondingly updated, to ensure that secure boot can be performed based on the newly enabled cryptographic algorithm 1 after the network device reboots. The cryptographic resource in the flash memory is used to perform integrity verification on the image file that is of the application and that is loaded by the network device, and the cryptographic resource baseline information in the secure storage entity is used to perform integrity verification on the cryptographic resource in the flash memory. An updated cryptographic resource in the flash memory includes but is not limited to the public key B corresponding to the cryptographic algorithm 1.

Figure 6A:
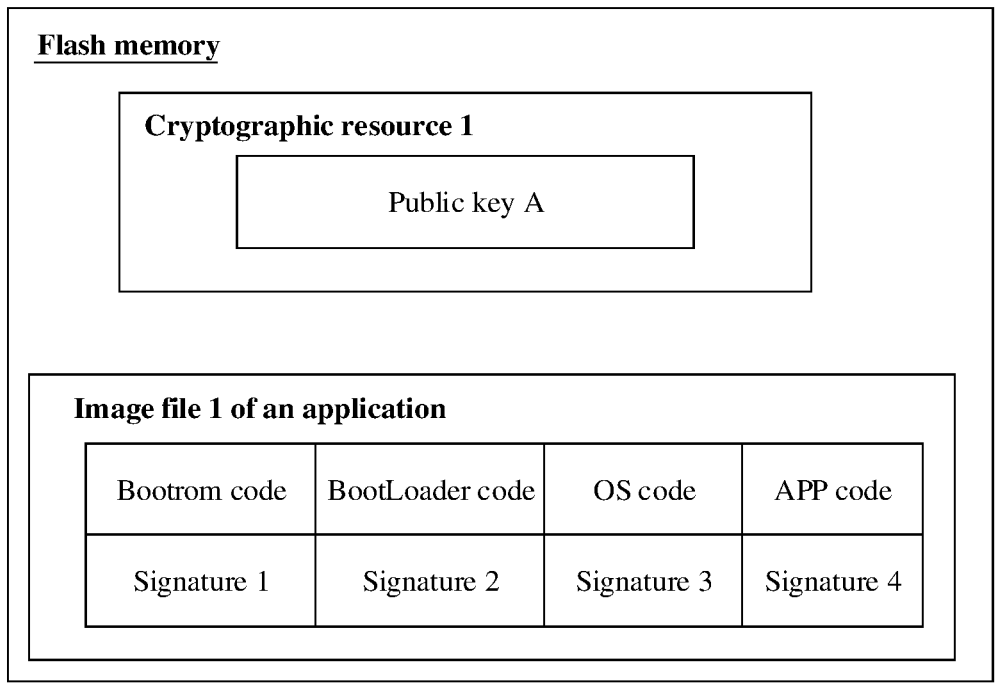
FIG. 6A is a schematic diagram of a structure of a flash memory before updating according to an embodiment of this application.

For example, before a cryptographic resource 1 and an image file 1 of an application in the flash memory are updated, for a structure of the flash memory, refer to FIG. 6A. The cryptographic resource 1 may include at least the public key A. The image file 1 of the application may include a Bootrom code, a signature 1 of the Bootrom code, a BootLoader code, a signature 2 of the BootLoader code, an OS code, a signature 3 of the OS code, an APP code, and a signature 4 of the APP code, where the signature 1 to the signature 4 are obtained by performing digital signature based on the cryptographic algorithm 2 and the private key A corresponding to the cryptographic algorithm 2. During specific implementation, a process of performing secure boot based on the cryptographic algorithm 2 may include: S31: Power on the network device. S32: Perform integrity verification on the cryptographic resource 1 in the flash memory based on the baseline information 2 in the cryptographic resource baseline information before S102 is performed. S33: If the integrity verification on the cryptographic resource 1 in the flash memory succeeds, perform integrity verification on the image file 1 of the application by using the cryptographic resource 1 in the flash memory, to complete the secure boot.

Figure 6B:
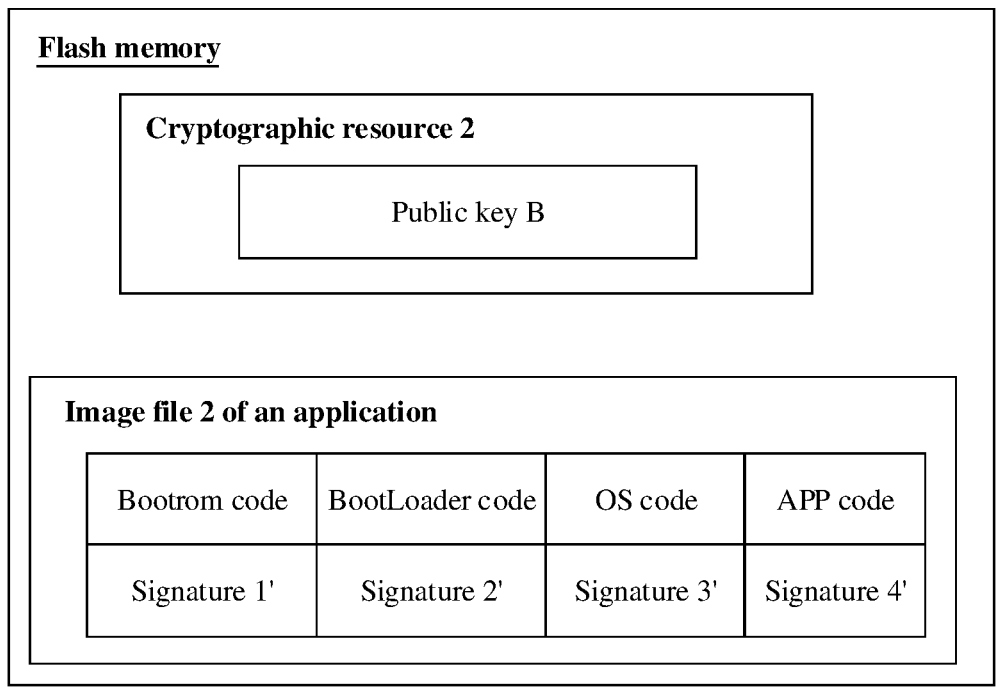
FIG. 6B is a schematic diagram of a structure of a flash memory after updating according to an embodiment of this application.

After the cryptographic resource 1 in the flash memory and the image file 1 of the application are updated, for a structure of the flash memory, refer to FIG. 6B. An updated cryptographic resource in the flash memory is denoted as a cryptographic resource 2. The cryptographic resource 2 may include at least the public key B corresponding to the cryptographic algorithm 1. An image file 2 of the application may include a Bootrom code, a signature 1' of the Bootrom code, a BootLoader code, a signature 2' of the BootLoader code, an OS code, a signature 3' of the OS code, an APP code, and a signature 4' of the APP code, where the signature 1' to the signature 4' are obtained by performing digital signature based on the cryptographic algorithm 1 and the private key B corresponding to the cryptographic algorithm 1. During specific implementation, a process of performing secure boot based on the cryptographic algorithm 1 may include: S41: Power on the network device. S42: Perform integrity verification on the cryptographic resource 2 in the flash memory based on the cryptographic resource baseline information 1 in the cryptographic resource baseline information after S102 is performed. S43: If the integrity verification on the cryptographic resource 2 in the flash memory succeeds, perform integrity verification on the image file 2 of the application by using the cryptographic resource 2 in the flash memory, to complete the secure boot.

It should be noted that the Bootrom code, the BootLoader code, the OS code, and the APP code in the image file 2 of the application may be the same as or different from the Bootrom code, the BootLoader code, the OS code, and the APP code in the image file 1 of the application. This is not specifically limited in this embodiment of this application. If software upgrade is performed when the cryptographic resource baseline information is updated, some or all of the codes in the image file 2 of the application and the image file 1 of the application are different.

S42 of performing integrity verification on the cryptographic resource 2 in the flash memory based on the cryptographic resource baseline information 1 in the cryptographic resource baseline information shown in FIG. 3B may include: S421: Verify integrity of the public key B in the cryptographic resource 2 in the flash memory based on the public key baseline value b in the cryptographic resource baseline information 1 corresponding to the cryptographic algorithm 1. If the public key baseline value b in the cryptographic resource baseline information 1 is a hash value of the public key B, for example, S421 may include: calculating a hash value of the public key B in the cryptographic resource 2 in the flash memory, comparing whether the hash value is the same as the public key baseline value b, and if the hash value is the same as the public key baseline value b, determining that the integrity verification on the cryptographic resource 2 in the flash memory succeeds. If the public key baseline value b in the cryptographic resource baseline information 1 is plaintext of the public key B, for example, S421 may include: comparing whether the public key B in the cryptographic resource 2 in the flash memory is the same as the public key baseline value b, and if the public key B is the same as the public key baseline value b, determining that the integrity verification on the cryptographic resource 2 in the flash memory succeeds. In addition, S42 may further include: S422: Verify whether the cryptographic algorithm 1 in the cryptographic resource baseline information 1 is consistent with the cryptographic algorithm 1 in the cryptographic resource 2.

For another example, if the indication information 2 indicates to suspend the cryptographic algorithm 1, the network device may set the status of the cryptographic algorithm 1 to the suspended state based on the indication information 2. Suspending the cryptographic algorithm 1 may include disabling the cryptographic algorithm 1 and revoking the cryptographic algorithm 1. In one case, if the indication information 2 indicates to disable the cryptographic algorithm 1, for example, S102 may include: disabling the cryptographic algorithm 1, to be specific, setting a usage status of the cryptographic algorithm 1 to a disabled state. In another case, if the indication information 2 indicates to revoke the cryptographic algorithm 1, for example, S1o2 may include: revoking the cryptographic algorithm 1, to be specific, setting the usage status of the cryptographic algorithm 1 to a revoked state. For example, the setting the usage status of the cryptographic algorithm 1 to a revoked state may be setting revocation identification information 1 corresponding to the cryptographic algorithm 1 to indicate that the usage status of the cryptographic algorithm 1 is the revoked state, to be specific, burning the revocation identification information 1 corresponding to the cryptographic algorithm 1. In this way, a cryptographic algorithm that cannot satisfy a user requirement or a security requirement is suspended, so that it is ensured that secure boot of the network device can be effectively implemented, and the security of the network device is improved.

For example, if the cryptographic algorithm 1 corresponding to the cryptographic resource baseline information 1 in the network device only does not satisfy a current security requirement and there is a possibility that the cryptographic algorithm 1 is rolled back for use, and the cryptographic resource baseline information 1 is securely stored in a form of software, for example, in S102, the software state bit corresponding to the cryptographic algorithm 1 may be set to the disabled state, so that the software state bit corresponding to the cryptographic algorithm 1 can be set to an enabled state when the cryptographic algorithm 1 needs to be subsequently rolled back for use. Alternatively, if the cryptographic algorithm 1 corresponding to the cryptographic resource baseline information 1 in the network device does not satisfy a current security requirement and there is no possibility that the cryptographic algorithm 1 is rolled back for use, or the cryptographic resource baseline information 1 is stored in a form of hardware burning, the revocation identification information 1 corresponding to the cryptographic algorithm 1 may be set to the revoked state. Once the revocation identification information 1 is set to the revoked state, the cryptographic algorithm 1 is permanently invalid and cannot be rolled back for use.

In a specific implementation, before S102 is performed, if secure boot of the network device satisfies a preset condition, it may be considered that secure boot can be stably completed by using a newly enabled cryptographic algorithm, and the network device may implement S102 to suspend the previously used cryptographic algorithm 1. For example, the preset condition may mean a preset quantity of times that the network device successfully performs secure boot by using the newly enabled cryptographic algorithm; or preset duration that is after secure boot succeeds and in which the network device runs normally.

For example, it is assumed that the cryptographic algorithm 1 is an RSA algorithm. Before the method 100 is performed, for a format of the cryptographic resource baseline information, refer to FIG. 3A, FIG. 3B, or FIG. 3D. After the method 100 is performed, for a format of the cryptographic resource baseline information, refer to FIG. 3C.

In this way, a cryptographic algorithm that cannot satisfy a user requirement or a security requirement is suspended, so that it is ensured that secure boot of the network device can be effectively implemented, and network security is improved to some extent.

It can be learned that according to the method provided in this embodiment of this application, once a currently used cryptographic algorithm cannot satisfy a security requirement or a user requirement, the network device obtains indication information online, updates, based on the indication information, cryptographic resource baseline information preset in the secure storage entity of the network device, and enables a cryptographic algorithm that satisfies the requirement or suspends the cryptographic algorithm that does not satisfy the requirement. In this way, secure boot is performed on the network device by using updated cryptographic resource baseline information; even if a requirement for a cryptographic algorithm in secure boot changes, the network device or a chip in the network device does not need to be recalled and redesigned. According to the method provided in this embodiment of this application, a cryptographic resource can be conveniently and flexibly updated to satisfy a changed security requirement, and different cryptographic algorithms can be adjusted online based on different requirements to perform secure boot as required, so that security of the network device is improved.

Figure 7:
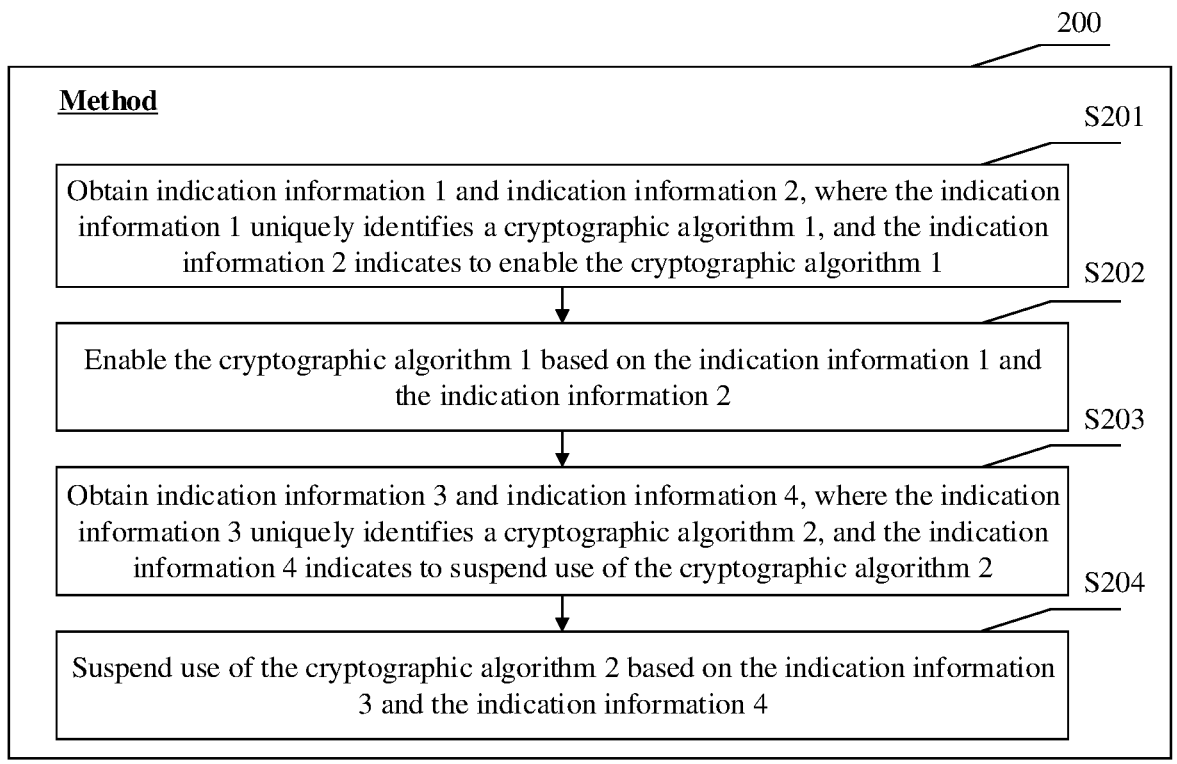
FIG. 7 is a schematic flowchart of a method 200 for managing a cryptographic resource used for secure boot according to an embodiment of this application.

In this embodiment of this application, when the current cryptographic algorithm 2 cannot satisfy a requirement, the network device may suspend the cryptographic algorithm 2 by enabling the new cryptographic algorithm 1, and manage the cryptographic resource to satisfy the requirement. Based on this, an embodiment of this application further provides a method 200 for managing a cryptographic resource used for secure boot. As shown in FIG. 7, for example, the method 200 may include the following steps.

S201: Obtain indication information 1 and indication information 2, where the indication information 1 uniquely identifies a cryptographic algorithm 1, and the indication information 2 indicates to enable the cryptographic algorithm 1.

S202: Enable the cryptographic algorithm 1 based on the indication information 1 and the indication information 2.

For example, S201 may include: obtaining, by a network device, an update file 1, where the update file 1 carries the indication information 1 and the indication information 2.

It should be noted that for related descriptions of S201 and S202, refer to related descriptions of enabling the cryptographic algorithm 1 in S11 and S102 in the method 100.

S203: Obtain indication information 3 and indication information 4, where the indication information 3 uniquely identifies a cryptographic algorithm 2, and the indication information 4 indicates to suspend use of the cryptographic algorithm 2.

For example, suspending the cryptographic algorithm 2 in cryptographic resource baseline information may include two possible meanings: disabling the cryptographic algorithm 2 and revoking the cryptographic algorithm 2. For specific descriptions, refer to related descriptions of suspending the cryptographic algorithm 1 in S102.

For a manner in which the network device obtains the indication information 3 and the indication information 4, refer to related descriptions of the manner in which the network device obtains the indication information 1 and the indication information 2 in the method 100.

It should be noted that the indication information 3 and the indication information 4 may be carried in an update file. For a manner of obtaining the update file, refer to related descriptions of the manner of obtaining the update file 1 in S101.

The indication information 3 uniquely identifies the cryptographic algorithm 2. The indication information 3 may be, for example, a binary value of a code corresponding to the cryptographic algorithm 2. For example, the indication information 3 is {0, 0, 0}, and identifies an RSA algorithm. Alternatively, the indication information 3 may be, for example, a bit corresponding to the cryptographic algorithm 2. For example, the indication information 3 is 00000001, and identifies an RSA algorithm.

The indication information 4 indicates the network device to suspend the cryptographic algorithm 2. If the indication information 3 and the indication information 4 are carried in the update file, in a specific example, a value of a specific field in the update file may indicate different meanings of the indication information 4. For example, the indication information 4 may be a field that is in the update file and that indicates a file type. In another specific example, the indication information 4 may alternatively be a separate field in the update file. For example, a specific meaning of the indication information 4 may be indicated by using a binary value or a bit mapping manner.

For example, S203 may be: The network device obtains an update file 2, where the update file 2 may include the indication information 3 and the indication information 4. The update file 2 and the update file 1 are two different files used to manage cryptographic resources. A file type of the update file 1 is an enabling file, and a type of the update file 2 is a suspension file. For example, the update file 2 may be generated by a device corresponding to a user or a supplier based on an actual requirement and sent to the network device. For another example, the update file 2 may alternatively be configured by a user or a supplier on the network device based on an actual requirement. It should be noted that, for a manner of obtaining the update file 2, refer to related descriptions of the manner of obtaining the update file 1 in S101.

In addition to the indication information 3 and the indication information 4, the update file 2 may further include a public key B and a signature Z. The signature Z is obtained after the update file 2 is digitally signed by using a private key B corresponding to the newly enabled cryptographic algorithm 1 and the cryptographic algorithm 1. In addition, the update file 2 may further include an identifier of the currently valid cryptographic algorithm 1, where the identifier is used to verify the update file 2, to improve security of the network device.

During specific implementation, after the network device receives the update file 2, a verification process performed by the network device may include: S51: Obtain, based on the identifier that is of the cryptographic algorithm 1 and that is in the update file 2, cryptographic resource baseline information 1 that corresponds to the cryptographic algorithm 1 and that is in the cryptographic resource baseline information. S52: Determine, based on enabling identification information 1 and suspension identification information 1 in the cryptographic resource baseline information 1, that the cryptographic algorithm 1 is an enabled and non-suspended valid cryptographic algorithm. S53: The network device obtains a public key baseline value b in the cryptographic resource baseline information 1, and performs integrity verification on the public key B in the update file 2 by using the public key baseline value b. S54: The network device verifies the signature Z by using the cryptographic algorithm 1 and the public key B on which the verification succeeds. S55: If the verification on the signature Z succeeds, the network device determines that the update file 2 is complete and trustworthy. In this way, the following S204 may be performed. For example, suspension identification information 2 in cryptographic resource baseline information 2 corresponding to the cryptographic algorithm 2 is set based on the indication information 3 and the indication information 4 in the update file 2, to indicate that a usage status of the cryptographic algorithm 2 is a suspended state.

It should be noted that the public key B in the update file 2 may be a root public key of the network device; or the public key B in the update file 2 may be a public key derived by the network device based on a root public key, for example, a secondary public key of the network device.

In addition, to improve the security, the update file 2 may further include device identification information of the network device. In this case, for example, S55 in the verification process performed by the network device after the network device receives the update file 2 may include: after the verification on the signature Z succeeds, obtaining the device identification information of the network device from the update file 2, and performing matching verification on the device identification information. If the device identification information of the network device matches the network device, it is considered that the update file 2 is trustworthy; otherwise, it is considered that the update file 2 is not trustworthy, and S204 is not performed.

Figure 8A:
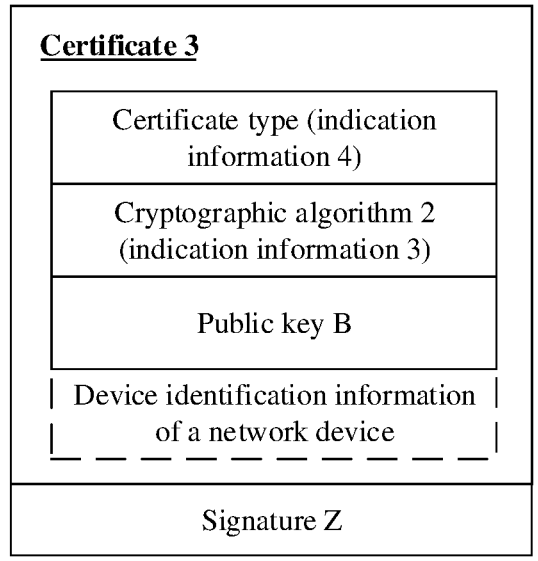
FIG. 8A is a schematic diagram of a structure of a certificate 3 according to an embodiment of this application.

To ensure integrity and authenticity of the update file that carries the indication information, the update file that carries the indication information may be, for example, a certificate. If the indication information 1 and the indication information 2 are carried in the update file 1, and the indication information 3 and the indication information 4 are carried in the update file 2, the update file 1 may be the certificate 1 shown in FIG. 5A, and the update file 2 may be a certificate 3 shown in FIG. 8A. The certificate 3 may carry a certificate type, the cryptographic algorithm 2, the public key B, and the signature Z. In addition, the certificate 3 may further carry the device identification information of the network device. The certificate type may be used as the indication information 4, to indicate that the certificate 3 is a suspension certificate. The cryptographic algorithm 2 may be, for example, 000 or 00000001, used as the indication information 3, to indicate an RSA algorithm.

In this way, one update file carries the indication information 1 and the indication information 2, and the other update file carries the indication information 3 and the indication information 4. On a basis of improving the security of the network device, the previously used cryptographic algorithm can be controlled to be suspended only after the new cryptographic algorithm is enabled and stably used for secure boot, so that a problem that the network device cannot work normally due to unsuccessful or unstable secure boot performed by using the newly enabled cryptographic algorithm is effectively avoided, and reliability of the network device is improved.

For another example, S203 may be: The network device obtains the indication information 3 and the indication information 4 from the update file 1. The update file 1 may include the indication information 1 to indication information 4. In this way, the network device may implement S201 and S203 at the same time. A file type of the update file 1 is an enabling and suspension file, to be specific, the update file 1 has functions of enabling the cryptographic algorithm 1 and suspending the cryptographic algorithm 2. For example, values of a field corresponding to the file type of the update file may be 0, 1, and 2. If the value of the field corresponding to the file type of the update file 1 is 0, the network device determines that the update file is an enabling file; if the value of the field corresponding to the file type of the update file 1 is 1, the network device determines that the update file is a suspension file; or if the value of the field corresponding to the file type of the update file 1 is 2, the network device determines that the update file is an enabling and suspension file.

In addition to the indication information 1 to the indication information 4, the update file 1 may further include a public key A, a public key baseline value b, and a signature W. The signature W is obtained after the update file 1 is digitally signed by using a private key A corresponding to the invalid cryptographic algorithm 2 and the cryptographic algorithm 2.

During specific implementation, after the network device receives the update file 1, for a verification process implemented before S202, refer to S11 to S15. Before S204 is performed, a verification process for implementation may include: S61: The network device obtains a public key baseline value a in the cryptographic resource baseline information 2, and performs integrity verification on the public key A in the update file 1 by using the public key baseline value a. S62: The network device verifies the signature W by using the cryptographic algorithm 2 and the public key A on which the verification succeeds. S63: If the verification on the signature W succeeds, it is considered that the update file 1 is complete and trustworthy. In this way, the following S204 may be performed. For example, suspension identification information 2 in the cryptographic resource baseline information 2 corresponding to the cryptographic algorithm 2 is set to a suspended state based on the indication information 3 and the indication information 4 in the update file 1.

It should be noted that the public key A in the update file 1 may be a root public key of the network device; or the public key A in the update file 1 may be a public key derived by the network device based on a root public key, for example, a secondary public key of the network device.

In addition, to improve the security, the update file 1 may further include device identification information of the network device. In this case, for example, the verification process performed by the network device after the network device receives the update file 1 may include: after the verification on the signature W succeeds, obtaining the device identification information of the network device from the update file 1, and performing matching verification on the device identification information. If the device identification information of the network device matches the network device, it is considered that the update file 1 is trustworthy; otherwise, it is considered that the update file 1 is not trustworthy, and S204 is not performed.

Figure 8B:
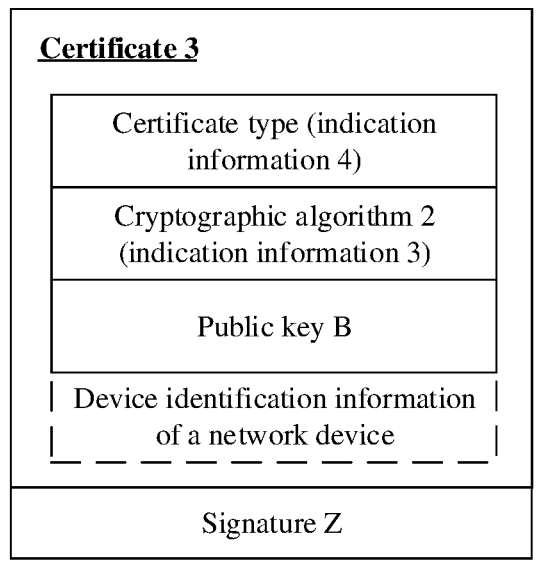
FIG. 8B is a schematic diagram of a structure of a certificate 4 according to an embodiment of this application.

To ensure integrity and authenticity of the update file that carries the indication information, the update file that carries the indication information may be, for example, a certificate. The update file 1 may be, for example, a certificate 4 shown in FIG. 8B. The certificate 4 may carry a certificate type, the cryptographic algorithm 1, the public key A, the cryptographic algorithm 2, and the signature W. In addition, the certificate 4 may further carry the public key baseline value b and the device identification information of the network device. The certificate type may be used as the indication information 2 and the indication information 4, and indicates that the certificate 4 is an enabling and suspension certificate. For example, the cryptographic algorithm 1 may be 001 or 00000010, and is used as the indication information 1 to indicate an ECC algorithm. For example, the cryptographic algorithm 2 may be 000 or 00000001, and is used as the indication information 3 to indicate an RSA algorithm. The signature W is obtained by performing digital signature on the certificate 4 by using the cryptographic algorithm 2 and the private key A corresponding to the cryptographic algorithm 2. In this case, S203 may include: after performing secure boot on the network device by using the newly enabled cryptographic algorithm 1, the network device verifies the certificate 4 in S61 to S63, and obtains the indication information 3 and the indication information 4 from the certificate 4 after the verification succeeds, so as to suspend the cryptographic algorithm 2 based on S204.

In this way, one update file carries the indication information 1 to the indication information 4. On a basis of improving the security of the network device, because enabling of the new cryptographic algorithm and suspension of the previously used cryptographic algorithm can be implemented by using only one update file, information exchange in a network is reduced, and network resources are saved.

S204: Suspend use of the cryptographic algorithm 2 based on the indication information 3 and the indication information 4.

For example, after S202, if secure boot performed by the network device by using the cryptographic algorithm 1 and the public key baseline value b in the cryptographic resource baseline information satisfies a preset condition, the network device may suspend the cryptographic algorithm 2 based on the indication information 3 and the indication information 4. In this example, the indication information 3 and the indication information 4 may be, for example, carried in a suspension instruction; or the network device requests the indication information 3 and the indication information 4 from a trusted device in response to an indication of a suspension instruction. For example, the preset condition may mean a preset quantity of times that secure boot succeeds; or preset duration that is after secure boot succeeds and in which the network device runs normally. When secure boot performed by using the cryptographic algorithm 1 satisfies the preset condition, it may be considered that secure boot can be stably completed by using the cryptographic algorithm 1 and the public key baseline value b in updated cryptographic resource baseline information 1.

For another example, if the network device configures a flag bit after S202, a value of the flag bit indicates that the cryptographic algorithm 1 is used for the first time. In this case, after the network device reboots, if it can be determined, based on the flag bit, that the cryptographic algorithm 1 is used for the first time, the network device obtains the indication information 3 and the indication information 4, and suspends the cryptographic algorithm 2. In this way, the network device does not need to receive a suspension instruction, and may suspend, as indicated by the flag bit, the cryptographic algorithm 2 used before S202. In this example, the flag bit may be further modified after the cryptographic algorithm 2 is suspended, so that the value of the flag bit indicates that the cryptographic algorithm 1 is not used for the first time, to ensure that the cryptographic algorithm is not suspended subsequently as indicated by the flag bit.

If the indication information 4 indicates to suspend the cryptographic algorithm 2, the network device may set the usage status of the cryptographic algorithm 2 to a disabled state or a revoked state based on the indication information 4. In one case, when the cryptographic resource baseline information is stored in a secure storage entity of the network device in a form of hardware burning, for example, S204 may include: setting disabling identification information 2 in the cryptographic resource baseline information 2 corresponding to the cryptographic algorithm 2 to the disabled state or setting revocation identification information 2 to the revoked state. In another case, when the cryptographic resource baseline information is securely stored in the network device in a form of software, for example, S204 may include: setting a software state bit corresponding to the cryptographic algorithm 2 to the disabled state or the revoked state.

For example, it is assumed that the cryptographic algorithm 2 is an RSA algorithm, and the cryptographic algorithm 1 is an ECC algorithm. Before the method 200 is performed, for a format of the cryptographic resource baseline information, refer to FIG. 3A. After S202 of the method 200 is performed and before S204, for a format of the cryptographic resource baseline information, refer to FIG. 3B. After S204 of the method 200 is performed, for a structure of the cryptographic resource baseline information, refer to FIG. 3C.

In some possible implementations, suspension of the cryptographic algorithm 2 used before S202 may be alternatively completed according to a policy locally configured by the network device. During specific implementation, after the network device enables the cryptographic algorithm 1, if the network device locally detects that no exception occurs during secure boot performed by using the cryptographic algorithm 1 within the preset duration, or secure boot performed by using the cryptographic algorithm 1 for the preset quantity of times succeeds, the network device determines that a condition for suspending the cryptographic algorithm 2 in the local policy is satisfied, and suspends the cryptographic algorithm 2. In this way, the network device does not need to additionally receive an update file used to suspend the cryptographic algorithm 2, and does not need to obtain the indication information 3 and the indication information 4 after the cryptographic algorithm 1 is enabled. A local simplified configuration avoids a problem that a requirement cannot be satisfied because after the cryptographic algorithm 1 is enabled, the cryptographic algorithm 2 is rolled back to perform secure boot, and resolves a problem that the network device cannot boot because the cryptographic algorithm 2 is suspended too early when the cryptographic algorithm 2 fails to be updated to the cryptographic algorithm 1. Therefore, network resources are saved and the security of the network device is improved.

It can be learned that, in this implementation, after it is ensured that secure boot of the network device can be successfully completed by enabling a new cryptographic algorithm, indication information is obtained online, and previously used cryptographic resource baseline information in the secure storage entity of the network device is suspended based on the indication information. This prevents secure boot from being performed by using a cryptographic algorithm that does not satisfy a requirement, and overcomes a problem that secure boot of the network device cannot satisfy a security requirement or a user requirement, so that the network device can effectively adjust, as required, a cryptographic resource used for secure boot. Therefore, the security of the network device is improved.

Figure 9:
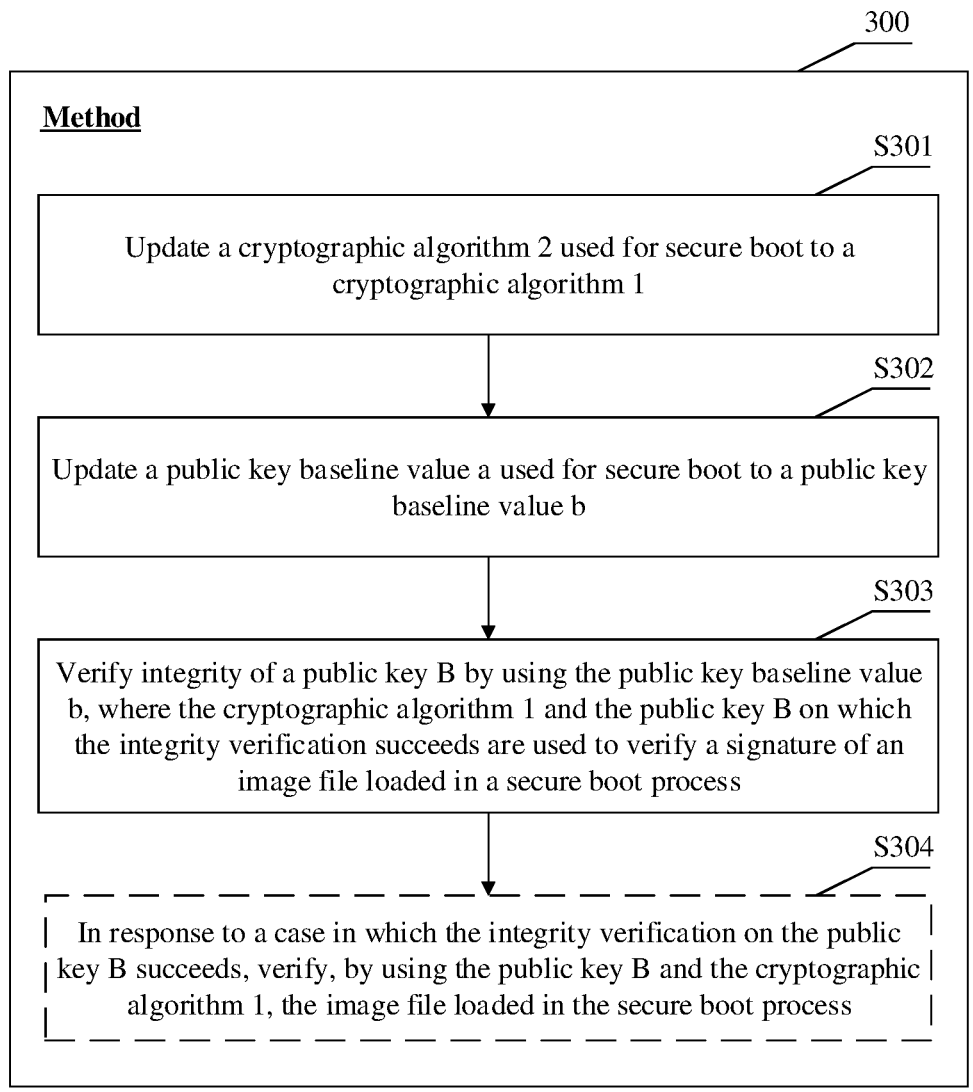
FIG. 9 is a schematic flowchart of a secure boot method 300 according to an embodiment of this application.

FIG. 9 is a schematic flowchart of another secure boot method 300 according to an embodiment of this application. Refer to FIG. 9. For example, the method 300 may include the following steps.

S301: Update a cryptographic algorithm 2 used for secure boot to a cryptographic algorithm 1.

During specific implementation, S301 may include: S301a: Enable the cryptographic algorithm 1. S301b: Suspend the cryptographic algorithm 2. For related descriptions of a specific implementation of S3o1a, refer to related descriptions of enabling the cryptographic algorithm 1 in the method 100, or refer to related descriptions of S201 and S202 in the method 200. For related descriptions of a specific implementation of S301b, refer to related descriptions of suspending the cryptographic algorithm 1 in the method 100, or refer to related descriptions of S203 and S204 in the method 200.

For example, assuming that a network device obtains an update file 1 and an update file 2, where the update file 1 is used to enable the cryptographic algorithm 1, and the update file 2 is used to suspend the cryptographic algorithm 2, for example, S3o1a may include: enabling the cryptographic algorithm 1 based on the update file 1; for example, S301b may include: suspending the cryptographic algorithm 2 based on the update file 2. It is assumed that the cryptographic algorithm 1 is an ECC algorithm, the cryptographic algorithm 2 is an RSA algorithm, a specific format of the update file 1 is the certificate 1 shown in FIG. 5A, and for a specific format of the update file 2, refer to the certificate 3 shown in FIG. 8A. Before S301 is performed, for a structure of cryptographic resource baseline information in a secure storage entity of the network device, refer to FIG. 3A or FIG. 3D. After S302 is performed, for a structure of cryptographic resource baseline information in the secure storage entity of the network device, refer to FIG. 3C. The update file 2 may alternatively be used to revoke the cryptographic algorithm 2. In this case, for example, S301b may include: revoking the cryptographic algorithm 2 based on the update file 2.

For another example, assuming that a network device obtains an update file 1, where the update file 1 is used to enable the cryptographic algorithm 1 and suspend the cryptographic algorithm 2, for example, S301a may include: enabling the cryptographic algorithm 1 based on the update file 1; for example, S301b may include: suspending the cryptographic algorithm 2 based on the update file 1. It is assumed that the cryptographic algorithm 1 is an ECC algorithm, the cryptographic algorithm 2 is an RSA algorithm, and a specific format of the update file 1 is the certificate 4 shown in FIG. 8B. Before S301 is performed, for a structure of cryptographic resource baseline information in a secure storage entity of the network device, refer to FIG. 3a or FIG. 3D. After S302 is performed, for a structure of cryptographic resource baseline information in the secure storage entity of the network device, refer to FIG. 3C.

It should be noted that suspending use of the cryptographic algorithm 2 may be specifically disabling the cryptographic algorithm 2 or revoking the cryptographic algorithm 2.

S302: Update a public key baseline value a used for secure boot to a public key baseline value b.

In a specific implementation, if the secure storage entity stores corresponding public key baseline values for a plurality of preset cryptographic algorithms, enabling the cryptographic algorithm 1 may also indicate enabling the public key baseline value b in cryptographic resource baseline information 1 corresponding to the cryptographic algorithm 1, and indicate updating the public key baseline value a used for secure boot to the public key baseline value b.

In another specific implementation, for a plurality of preset cryptographic algorithms, if the secure storage entity stores only a public key baseline value corresponding to an enabled cryptographic algorithm, and space into which a corresponding public key baseline value is reserved in cryptographic resource baseline information corresponding to a cryptographic algorithm that is not enabled, the network device may alternatively obtain the public key baseline value b corresponding to the cryptographic algorithm 1, for example, S302 may include: storing, by the network device, the public key baseline value b in the secure storage entity. For example, the public key baseline value b is written into a location, in the secure storage entity, corresponding to a public key baseline value 1 of cryptographic resource baseline information 1 corresponding to the cryptographic algorithm 1. If indication information 1 and indication information 2 are carried in the update file 1, and the public key baseline value b corresponding to the cryptographic algorithm 1 may also be carried in the update file 1, that the network device obtains the public key baseline value b corresponding to the cryptographic algorithm 1 may be: The network device obtains the public key baseline value b from the update file 1.

The public key baseline value b uniquely corresponds to a public key B, and is used to perform integrity verification on the public key B. The public key baseline value b may be, for example, plaintext of the public key B or a hash value of the public key B.

For example, it is assumed that the cryptographic algorithm 2 is an RSA algorithm, and the cryptographic algorithm 1 is an ECC algorithm. Before S301 is performed, for a format of the cryptographic resource baseline information, refer to FIG. 3A. After S301 and S302 are performed, for a format of the cryptographic resource baseline information, refer to FIG. 3B.

S303: Verify integrity of the public key B by using the public key baseline value b, where the cryptographic algorithm 1 and the public key B on which the integrity verification succeeds are used to verify a signature of an image file loaded in the secure boot process.

At the same time of S301 and S302, or after S302, a cryptographic resource in a flash memory and an image file of an application may also be correspondingly updated, to ensure that secure boot can be performed based on the newly enabled cryptographic algorithm 1 after the network device reboots. The cryptographic resource in the flash memory is used to perform integrity verification on the image file that is of the application and that is loaded by the network device, and the cryptographic resource baseline information in the secure storage entity is used to perform integrity verification on the cryptographic resource in the flash memory. An updated second cryptographic resource in the flash memory includes but is not limited to the public key B corresponding to the cryptographic algorithm 1.

It should be noted that for related descriptions of verifying the integrity of the public key B by using the public key baseline value b in S303, refer to related descriptions of FIG. 6A, S31 to S33, FIG. 6B, and S41 to S43 in the method 100.

In some possible implementations, after S303, the method 300 may further include:

S304: In response to a case in which the integrity verification on the public key B succeeds, verify, by using the public key B and the cryptographic algorithm 1, the image file loaded in the secure boot process.

It should be noted that, for example, the image file loaded in the secure boot process may include but is not limited to: Bootrom code, BootLoader code, OS code, and APP code. For details of S304, refer to the descriptions corresponding to FIG. 1. For example, after being powered on, the network device first executes BSBC. The BSBC verifies a signature 1 of the Bootrom code by using the public key B and the cryptographic algorithm 1, and executes Bootrom only after the verification succeeds. Then, the Bootrom verifies a signature 2 of the BootLoader code by using the public key B and the cryptographic algorithm 1, and executes BootLoader only after the verification succeeds. Then, the BootLoader verifies a signature 3 of the OS code by using the public key B and cryptographic algorithm 2, and boots an OS. Then, the OS verifies a signature 4 of the APP code by using the public key B and the cryptographic algorithm 1, and executes an APP after the verification succeeds. It should be noted that the signatures 1 to 4 are obtained by a trusted signature system by separately performing digital signature on the Bootrom code, the BootLoader code, the OS code, and the APP code based on the public key B and the cryptographic algorithm 1.

A process in which the trusted signature system performs digital signature on the APP code by using the public key B and the cryptographic algorithm 1 may include: first performing hash calculation on the APP code by using a hash algorithm to obtain a digital digest digest Y1, and then performing digital signature on the digest Y1 by using a private key B to obtain a signature digestEncode Y1. The trusted signature system may send the APP code and the digestEncode Y1 to the network device, and the flash memory of the network device stores the APP code and the digestEncode Y1. In secure boot, a process of verifying the signature digestEncode Y1 of the APP code may include: Before loading the APP code, the network device may first perform hash calculation by using a hash algorithm that is the same as that used during the signature for the APP code, to generate a digital digest digest Y2, then perform signature verification on the digestEncode Y1 by using the public key B to obtain digestDecode Y3, and determine whether the digestDecode Y3 and the digest Y2 are the same. If the digestDecode Y3 and the digest Y2 are the same, it may be determined that the APP code is not tampered with and is released by an authorized manufacturer, so that it is ensured that the APP code to be loaded by the network device is secure and reliable. The private key B and the public key B are a pair of keys provided by a manufacturer of the network device. The public key B is publicly visible, and the private key B is confidential and visible only to a signature system corresponding to the manufacturer.

It can be learned that according to the method provided in this embodiment of this application, once a currently used cryptographic algorithm cannot satisfy a security requirement or a user requirement, the network device updates the cryptographic algorithm used for secure boot and a corresponding public key baseline value online, to enable a cryptographic algorithm that satisfies the requirement. In this way, the newly enabled cryptographic algorithm is conveniently and flexibly enabled, and secure boot is performed on the network device by using the newly enabled cryptographic algorithm without recalling the network device or a chip in the network device, so that secure boot satisfies a changed security requirement, and different cryptographic algorithms are adjusted online based on different requirements to perform secure boot based on a cryptographic algorithm that satisfies a requirement. Therefore, security of the network device is improved.

Figure 10:
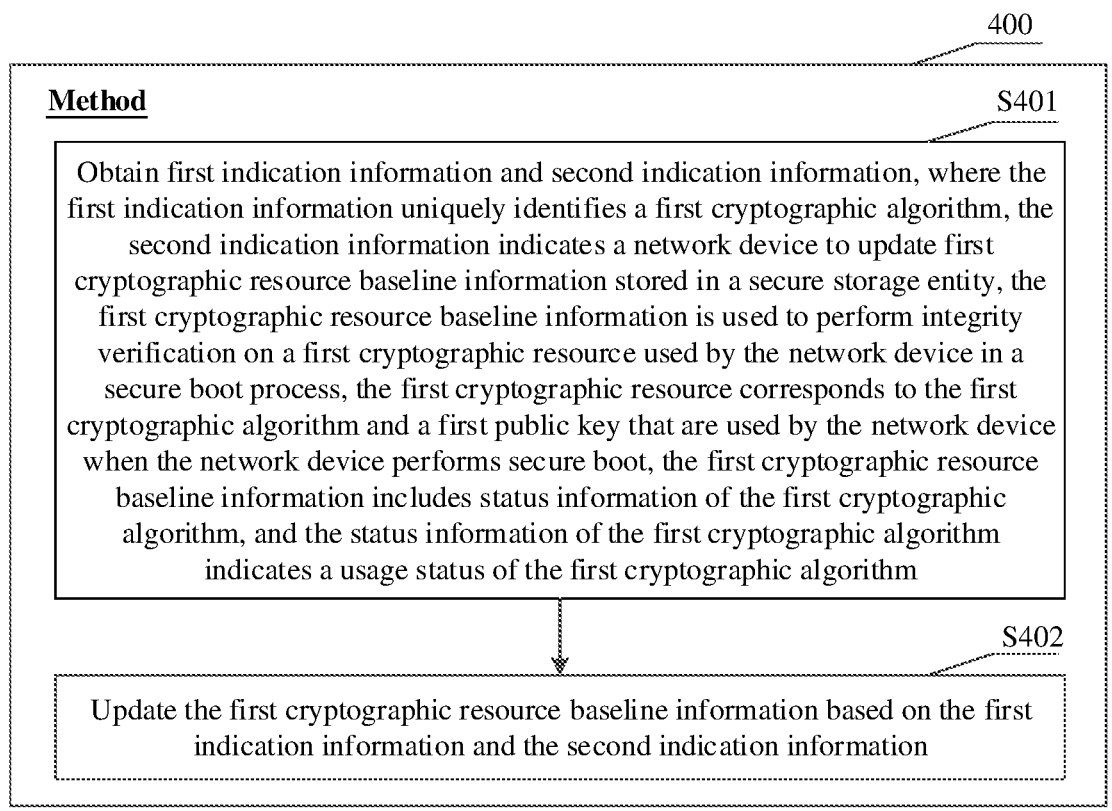
FIG. 10 is a schematic flowchart of a method 400 for managing a cryptographic resource used for secure boot according to an embodiment of this application.

FIG. 10 is a schematic flowchart of a network resource management method 400 according to an embodiment of this application. The method 400 is implemented by a network device. For example, the network resource management method 400 may include the following steps.

S401: Obtain first indication information and second indication information, where the first indication information uniquely identifies a first cryptographic algorithm, the second indication information is used to instruct the network device to update first cryptographic resource baseline information stored in a secure storage entity, the first cryptographic resource baseline information is used to perform integrity verification on a first cryptographic resource used by the network device in a secure boot process, the first cryptographic resource corresponds to the first cryptographic algorithm and a first public key that are used by the network device when the network device performs secure boot, the first cryptographic resource baseline information includes status information of the first cryptographic algorithm, and the status information of the first cryptographic algorithm indicates a usage status of the first cryptographic algorithm.

S402: Update the first cryptographic resource baseline information based on the first indication information and the second indication information.

The first cryptographic algorithm in a plurality of cryptographic algorithms may be any one of the following algorithms: an asymmetric cryptographic algorithm RSA, an elliptic curve cryptography ECC algorithm, a Chinese cryptographic asymmetric cryptographic algorithm SM2, a secure hash algorithm SHA, or a cryptographic hash algorithm SM3.

It should be noted that, in one case, the secure storage entity may be one-time programmable storage space in a processor; or in another case, the secure storage entity may be a security chip independent of a processor.

The network device in the method 400 may be specifically the network device in the method 100 or the network device in the method 200. For details about related operations, refer to the operations performed by the network device in the method 100 or the method 200. Specifically, for related descriptions of S401 and S402, refer to S101 and S102 in the method 100 or S201 and S202 in the method 200. The first indication information may be the indication information 1 in the method 100 or the method 200, the second indication information may be the indication information 2 in the method 100 or the method 200, the first cryptographic algorithm may be the cryptographic algorithm 1 in the method 100 or the method 200, and the first cryptographic resource baseline information may be the cryptographic resource baseline information 1 in the method 100.

In a possible implementation, the second indication information is specifically used to instruct to enable the first cryptographic algorithm. In this case, for example, the updating the first cryptographic resource baseline information in S402 may include: changing the status information of the first cryptographic algorithm, to set the usage status of the first cryptographic algorithm to an enabled state. For example, the setting the usage status of the first cryptographic algorithm to an enabled state may include: setting enabling identification information corresponding to the first cryptographic algorithm to indicate that the usage status of the first cryptographic algorithm is the enabled state. In one case, when cryptographic resource baseline information is stored in the secure storage entity of the network device in a form of hardware burning, for example, S402 may include: setting enabling identification information in the first cryptographic resource baseline information corresponding to the first cryptographic algorithm to the enabled state. In another case, when cryptographic resource baseline information is securely stored in the network device in a form of software, for example, S402 may include: setting a software status bit corresponding to the first cryptographic algorithm to the enabled state.

Updated first cryptographic resource baseline information further includes a first public key baseline value, and the first public key baseline value is used to perform integrity verification on the first public key. In a specific implementation, if the secure storage entity stores corresponding public key baseline values for the plurality of preset cryptographic algorithms, enabling the first cryptographic algorithm may also indicate enabling the first public key baseline value in the first cryptographic resource baseline information corresponding to the cryptographic algorithm. In another specific implementation, for the plurality of preset cryptographic algorithms, if the secure storage entity stores only a public key baseline value corresponding to an enabled cryptographic algorithm, and space into which a corresponding public key baseline value is to be written is reserved in cryptographic resource baseline information corresponding to a cryptographic algorithm that is not enabled, the updating the first cryptographic resource baseline information in S402 may include: obtaining, by the network device, the first public key baseline value corresponding to the first cryptographic algorithm, and storing the first public key baseline value in the secure storage entity. For example, the first public key baseline value is written into a corresponding location, in the secure storage entity, of the first cryptographic resource baseline information corresponding to the first cryptographic algorithm. If the first indication information and the second indication information are carried in a first update file, and the first public key baseline value corresponding to the first cryptographic algorithm may also be carried in the first update file, that the network device obtains the first public key baseline value corresponding to the first cryptographic algorithm may be: The network device obtains the first public key baseline value from the first update file.

The first public key baseline value is a hash value of the first public key or plaintext of the first public key. The first public key baseline value uniquely corresponds to the first public key, and is used to perform integrity verification on the first public key. The first public key baseline value is used to verify integrity of the first public key carried in the first update file. In addition, when the first cryptographic algorithm is valid, in the secure boot process of the network device, the first public key baseline value is used to perform integrity verification on the first public key in a cryptographic resource stored in a nonvolatile memory.

For example, after S402 and before the secure boot, the method 400 may further include: updating a second cryptographic resource in the nonvolatile memory to a first cryptographic resource, where the updated first cryptographic resource includes the first cryptographic algorithm and the first public key. In this case, the method 400 may further include: performing secure boot based on updated first cryptographic resource baseline information. For example, the secure boot process may include: performing, based on the updated first cryptographic resource baseline information, integrity verification on the updated cryptographic resource stored in the nonvolatile memory; and if the integrity verification on the cryptographic resource stored in the nonvolatile memory succeeds, verifying, based on the first public key and the first cryptographic algorithm, an image file that is of an application and that is digitally signed by using a first private key. The updated first cryptographic resource baseline information includes a first public key baseline value. For example, the performing, based on the updated first cryptographic resource baseline information, integrity verification on the updated cryptographic resource stored in the nonvolatile memory may include: performing, by using the first public key baseline value, integrity verification on the first public key stored in the nonvolatile memory. In this way, in this embodiment, after the cryptographic algorithm satisfying the requirement is flexibly updated, secure boot can be performed based on the cryptographic algorithm satisfying the requirement, so that security of the network device and use experience of the network device are improved.

For example, S401 may include: obtaining the first update file, where the first update file carries the first indication information and the second indication information. To ensure integrity and authenticity of the first update file, the first update file may be, for example, a certificate. A format of the certificate can be customized or use the standard X.509 format (namely, a standard format of a public key certificate in cryptography). In addition, the first update file may alternatively be another file in any format that can carry the first indication information and the second indication information and that can be identified and parsed by the network device. The first update file is not specifically limited in embodiments of this application.

For example, the first update file is signed by using a second private key and a second cryptographic algorithm, the plurality of cryptographic algorithms include the second cryptographic algorithm, the secure storage entity stores second cryptographic resource baseline information, the second cryptographic resource baseline information is used to perform integrity verification on the second cryptographic resource used by the network device in the secure boot process, and the second cryptographic resource corresponds to the second cryptographic algorithm and a second public key. Before performing secure boot by using the first cryptographic resource, the network device performs secure boot by using the second cryptographic resource, where the first update file further includes the second public key, and before the updating first cryptographic resource baseline information, the method 400 may further include: verifying a signature of the first update file based on the second cryptographic algorithm and the second public key. The second public key is a root public key of the network device; or the second public key is a public key derived based on a root key of the network device, for example, may be a secondary public key of the network device. It can be learned that when the verification on the first update file succeeds, it is considered that the first update file is not tampered with and is from a trusted source, it is determined that the first update file is reliable, and the cryptographic resource may be updated based on the first indication information and the second indication information in the first update file.

In a possible embodiment, a second public key baseline value is preset in the secure storage entity. In this way, before verifying a signature of the first update file based on the second cryptographic algorithm and the second public key, the method 400 may further include: performing, based on the second public key baseline value stored in the secure storage entity, integrity verification on the second public key carried in the first update file; and if the integrity verification on the second public key succeeds, verifying the signature of the first update file based on the second cryptographic algorithm and the second public key. Therefore, the security is higher.

In another possible embodiment, the first update file may further include device identification information of the network device, and the device identification information identifies the network device. For example, the device identification information of the network device includes any one of the following information: a chip identifier in the network device, a hardware identifier of the network device, an identifier of a user to which the network device belongs, an identifier of a manufacturer to which the network device belongs, an identifier of a domain to which the device belongs, an internet protocol IP address of the network device, a media access control MAC address of the network device, or an address of a network segment to which the network device belongs. In this case, after the verification on the first update file succeeds, matching verification may be further performed on the device identification information in the first update file and the network device. After the verification succeeds, it is determined that the first update file is for the network device, and the method 400 is implemented based on the first update file, to update the cryptographic resource.

In some possible implementations, the secure storage entity further stores the second cryptographic resource baseline information, the second cryptographic resource baseline information is used to perform integrity verification on the second cryptographic resource used by the network device in the secure boot process, the second cryptographic resource corresponds to the second cryptographic algorithm and the second public key; and before performing secure boot by using the first cryptographic resource, the network device performs secure boot by using the second cryptographic resource. In this case, the method 400 may further include: obtaining third indication information and fourth indication information, where the third indication information uniquely identifies the second cryptographic algorithm, and the fourth indication information indicates to suspend use of the second cryptographic algorithm. For example, the third indication information and the fourth indication information may be carried in the first update file. To be specific, the first indication information, the second indication information, the third indication information, and the fourth indication information are all carried in the first update file. For another example, the third indication information and the fourth indication information may alternatively be carried in a second update file. To be specific, the first indication information and the second indication information are carried in the first update file, and the third indication information and the fourth indication information are carried in the second update file. It should be noted that the second update file may be a certificate or another file in any format that can be identified and parsed by the network device. The second update file is not specifically limited in embodiments of this application.

In this implementation, the method 400 may further include: suspending use of the second cryptographic algorithm based on the third indication information and the fourth indication information. For example, the suspending use of the second cryptographic algorithm may include: suspending use of the second cryptographic algorithm after updating the first cryptographic resource baseline information.

The suspending use of the second cryptographic algorithm may include: disabling the second cryptographic algorithm or revoking the second cryptographic algorithm. For example, the disabling the second cryptographic algorithm may include: setting a usage status of the second cryptographic algorithm to a disabled state; and for example, the revoking the second cryptographic algorithm may include: setting the usage status of the second cryptographic algorithm to a revoked state. For example, the setting the usage status of the second cryptographic algorithm to a revoked state may be specifically: setting revocation identification information corresponding to the second cryptographic algorithm to indicate that the usage status of the second cryptographic algorithm is the revoked state.

The second cryptographic algorithm may be any one of the following cryptographic algorithms: an asymmetric cryptographic algorithm RSA, an elliptic curve cryptography ECC algorithm, a Chinese cryptographic asymmetric cryptographic algorithm SM2, a secure hash algorithm SHA, or a cryptographic hash algorithm SM3, where the first cryptographic algorithm and the second cryptographic algorithm are different cryptographic algorithms.

For details of the related embodiment of suspending the second cryptographic algorithm, refer to the operations performed by the network device in S203 and S204 in the method 200. The third indication information may be the indication information 3 in the method 200, the fourth indication information may be the indication information 4 in the method 200, and the second cryptographic algorithm may be the cryptographic algorithm 2 in the method 200.

In another possible implementation, the second indication information is specifically used to instruct the network device to suspend use of the first cryptographic algorithm. In this case, the updating the first cryptographic resource baseline information in S402 is specifically: changing the status information of the first cryptographic algorithm, to set the usage status of the first cryptographic algorithm to a suspended state. Suspending use of the first cryptographic algorithm may include: disabling the first cryptographic algorithm or revoking the first cryptographic algorithm. To disable the first cryptographic algorithm, the updating the first cryptographic resource baseline information may include, for example, changing the status information of the first cryptographic algorithm, to set the usage status of the first cryptographic algorithm to the disabled state. To revoke the first cryptographic algorithm, the updating first cryptographic resource baseline information may include, for example, changing the status information of the first cryptographic algorithm, to set the usage status of the first cryptographic algorithm to the revoked state. For example, if the status information of the first cryptographic algorithm includes revocation identification information, the changing the status information of the first cryptographic algorithm, to set the usage status of the first cryptographic algorithm to the revoked state includes: setting the revocation identification information to set the usage status of the first cryptographic algorithm to the revoked state.

For details about the related embodiment of suspending the first cryptographic algorithm, refer to the related operation of suspending the first cryptographic algorithm performed by the network device in the method 100. The third indication information may be the indication information 1 in the method 100, the fourth indication information may be the indication information 2 in the method 100, and the first cryptographic algorithm may be the cryptographic algorithm 1 in the method 100.

In this way, in the foregoing embodiment, after enabling a new cryptographic algorithm and performing secure boot on the network device by using the newly enabled cryptographic algorithm, the network device can suspend a cryptographic algorithm that does not satisfy a requirement, so that the cryptographic algorithm that does not satisfy the requirement is not used for secure boot of the network device. Therefore, secure boot that satisfies the requirement is implemented, and the security of the network device is improved.

It can be learned that according to the method 400 provided in this embodiment of this application, once a currently used cryptographic algorithm cannot satisfy a security requirement or a user requirement, the network device obtains indication information online, updates, based on the indication information, cryptographic resource baseline information preset in the secure storage entity of the network device, and enables a cryptographic algorithm that satisfies the requirement or suspends the cryptographic algorithm that does not satisfy the requirement. In this way, secure boot is performed on the network device by using updated cryptographic resource baseline information; even if a requirement for a cryptographic algorithm in secure boot changes, the network device or a chip in the network device does not need to be recalled and redesigned. According to the method provided in this embodiment of this application, a cryptographic resource can be conveniently and flexibly updated to satisfy a changed security requirement, and different cryptographic algorithms can be adjusted online based on different requirements to perform secure boot as required, so that security of the network device is improved.

It should be noted that, according to the method 400 in this embodiment of this application, for a specific implementation and an achieved effect, refer to related descriptions in the embodiments shown in FIG. 4 and FIG. 7.

Figure 11:
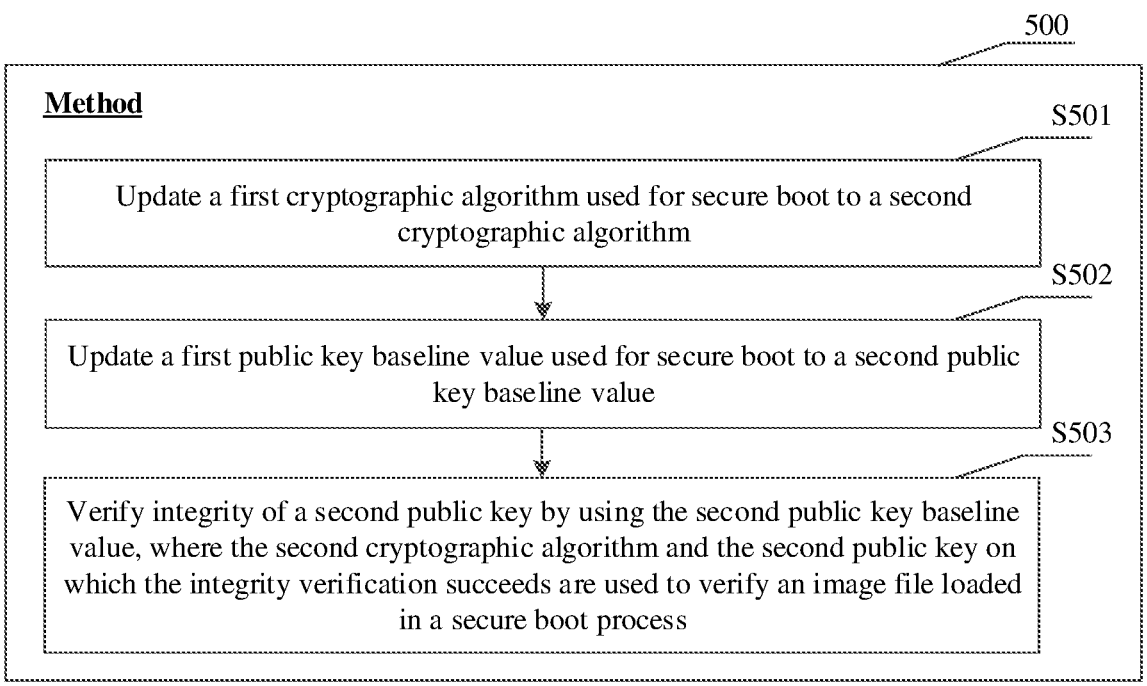
FIG. 11 is a schematic flowchart of a secure boot method 500 according to an embodiment of this application.

FIG. 11 is a schematic flowchart of a secure boot method 500 according to an embodiment of this application. The method 500 is implemented by a network device. For example, the secure boot method 500 may include the following steps.

S501: Update a first cryptographic algorithm used for secure boot to a second cryptographic algorithm.

S502: Update a first public key baseline value used for secure boot to a second public key baseline value.

S503: Verify integrity of a second public key by using the second public key baseline value, where the second cryptographic algorithm and the second public key on which the integrity verification succeeds are used to verify an image file loaded in a secure boot process.

The first cryptographic algorithm in a plurality of cryptographic algorithms may be any one of the following algorithms: an asymmetric cryptographic algorithm RSA, an elliptic curve cryptography ECC algorithm, a Chinese cryptographic asymmetric cryptographic algorithm SM2, a secure hash algorithm SHA, or a cryptographic hash algorithm SM3. The second cryptographic algorithm may be any one of the following algorithms: an RSA, an ECC algorithm, an SM2, an SHA, or an SM3. The first cryptographic algorithm and the second cryptographic algorithm are different.

It should be noted that, in one case, the secure storage entity that is in the network device and that is used to securely store cryptographic resource baseline information may be one-time programmable storage space in a processor; or in another case, the secure storage entity may be a security chip independent of a processor. The cryptographic resource baseline information may include first cryptographic resource baseline information and second cryptographic resource baseline information. The first cryptographic resource baseline information includes status information of the first cryptographic algorithm, and the status information of the first cryptographic algorithm indicates a usage status of the first cryptographic algorithm. Similarly, the second cryptographic resource baseline information includes status information of the second cryptographic algorithm, and the status information of the second cryptographic algorithm indicates a usage status of the second cryptographic algorithm. The first cryptographic resource baseline information is used to perform integrity verification on a first cryptographic resource used by the network device in the secure boot process, and the first cryptographic resource corresponds to the first cryptographic algorithm and a first public key that are used by the network device when the network device performs secure boot. Similarly, the second cryptographic resource baseline information is used to perform integrity verification on a second cryptographic resource used by the network device in the secure boot process, and the second cryptographic resource corresponds to the second cryptographic algorithm and the second public key that are used by the network device when the network device performs secure boot. In this case, after S502, integrity verification may be performed on the second cryptographic resource by using the second cryptographic resource baseline information, and then the image file loaded in the secure boot process is verified by using the second cryptographic resource on which the integrity verification succeeds.

The network device in the method 500 may be specifically the network device in the method 300. For details about related operations, refer to the operations performed by the network device in the method 300. Specifically, for related descriptions of S501 to S503, refer to S301 to S303 in the method 300. The first cryptographic algorithm may be the cryptographic algorithm 1 in the method 300, the second cryptographic algorithm may be the cryptographic algorithm 2 in the method 300, the first public key baseline value may be the public key baseline value a in the method 300, the second public key baseline value may be the public key baseline value b in the method 300, and the second public key may be the public key B in the method 300.

For example, the updating a first cryptographic algorithm to a second cryptographic algorithm in S501 may include: S501*a*: suspending the first cryptographic algorithm. S501*b*: enabling the second cryptographic algorithm. The suspending the first cryptographic algorithm in S501*b* includes two possible meanings: revoking the first cryptographic algorithm or disabling the first cryptographic algorithm.

For example, the method 500 may further include: If the integrity verification on the second public key succeeds, the network device may verify, by using the second public key and the second cryptographic algorithm, the image file loaded in the secure boot process.

In a specific implementation, for the plurality of preset cryptographic algorithms, if the secure storage entity stores corresponding public key baseline values, the second public key baseline value in S502 may be preset in the secure storage entity of the network device. In this case, that the second cryptographic algorithm is enabled indicates that the second public key baseline value in the second cryptographic resource baseline information corresponding to the second cryptographic algorithm is enabled.

In another specific implementation, for the plurality of preset cryptographic algorithms, if the secure storage entity stores only a public key baseline value corresponding to an enabled cryptographic algorithm, and space to which a corresponding public key baseline value is to be written is reserved in cryptographic resource baseline information corresponding to a cryptographic algorithm that is not enabled, the network device may further obtain the first public key baseline value corresponding to the first cryptographic algorithm. S502 may include: obtaining the second public key baseline value, and storing the second public key baseline value in the secure storage entity of the network device. For example, a manner of obtaining the second public key baseline value may include: obtaining a first update file, where the first update file carries the second public key baseline value; and obtaining the second public key baseline value from the first update file. The second public key baseline value is stored in the secure storage entity of the network device. For example, the second public key baseline value may be written into a corresponding location, in the secure storage entity, of the second cryptographic resource baseline information corresponding to the second cryptographic algorithm.

The second public key baseline value is a hash value of the second public key or plaintext of the second public key. The second public key baseline value uniquely corresponds to the second public key, and is used to perform integrity verification on the second public key. The second public key baseline value is used to verify integrity of the second public key carried in the first update file. In addition, when the second cryptographic algorithm is valid, in the secure boot process of the network device, the second public key baseline value is used to perform integrity verification on the second public key in a cryptographic resource stored in a nonvolatile memory.

For example, after 502 and before the secure boot, the method 500 may further include: updating the first cryptographic resource that is used for secure boot and that is stored in the nonvolatile memory to the second cryptographic resource, where the second cryptographic resource includes the second public key. In this case, for example, S503 may include: performing, by using the second public key baseline value, integrity verification on the second public key stored in the nonvolatile memory. If the integrity verification on the second cryptographic resource stored in the nonvolatile memory succeeds, signature verification is performed, based on the second public key and the second cryptographic algorithm, on an image file that is of an application and that is digitally signed by using a second private key. In this way, in this embodiment, after the cryptographic algorithm satisfying the requirement is flexibly updated, secure boot can be performed based on the cryptographic algorithm satisfying the requirement, so that the security of the network device and use experience of the network device are improved.

For example, the updating a first cryptographic algorithm used for secure boot to a second cryptographic algorithm in S501 may include: obtaining first indication information and second indication information, where the first indication information uniquely identifies the second cryptographic algorithm, and the second indication information is used to instruct the network device to enable the second cryptographic algorithm; and then enabling the second cryptographic algorithm based on the first indication information and the second indication information. For example, the enabling the second cryptographic algorithm may be: setting the usage status of the second cryptographic algorithm to an enabled state. The setting the usage status of the second cryptographic algorithm to an enabled state may include: setting enabling identification information corresponding to the second cryptographic algorithm to indicate that the usage status of the second cryptographic algorithm is the enabled state.

For example, the obtaining first indication information and second indication information may include: obtaining the first update file, where the first update file carries the first indication information and the second indication information. To ensure integrity and authenticity of the first update file, the first update file may be, for example, a certificate. A format of the certificate can be customized or use the standard X.509 format (namely, a standard format of a public key certificate in cryptography). In addition, the first update file may alternatively be another file in any format that can carry the first indication information and the second indication information and that can be identified and parsed by the network device. The first update file is not specifically limited in embodiments of this application.

For example, the first update file may be signed by using a first private key and the first cryptographic algorithm. Before performing secure boot by using the second cryptographic resource, the network device performs secure boot by using the first cryptographic resource, where the first cryptographic resource baseline information is used to perform integrity verification on a first cryptographic resource used by the network device in the secure boot process, and the first cryptographic resource corresponds to the first cryptographic algorithm and the first public key. The first update file may further include the first public key. The method 500 may further include: verifying a signature of the first update file based on the first cryptographic algorithm and the first public key. The first public key is a root public key of the network device; or the first public key is a public key derived based on a root key of the network device, for example, a secondary public key of the network device. It can be learned that when the verification on the first update file succeeds, it is considered that the first update file is not tampered with and is from a trusted source, it is determined that the first update file is reliable, and the cryptographic resource may be updated based on the first indication information and the second indication information in the first update file.

If the first public key baseline value is preset in the secure storage entity of the network device, before the verifying a signature of the first update file based on the first cryptographic algorithm and the first public key, the method 500 may further include: performing, based on the first public key baseline value, integrity verification on the first public key carried in the first update file; and if the integrity verification on the second public key succeeds, verifying the signature of the first update file based on the second cryptographic algorithm and the second public key. Therefore, the security is higher.

It is assumed that the first update file may further include device identification information of the network device, and the device identification information identifies the network device. For example, the device identification information of the network device includes any one of the following information: a chip identifier in the network device, a hardware identifier of the network device, an identifier of a user to which the network device belongs, an identifier of a manufacturer to which the network device belongs, an identifier of a domain to which the device belongs, an IP address of the network device, a MAC address of the network device, or an address of a network segment to which the network device belongs. In this case, after the verification on the first update file succeeds, matching verification may be further performed on the device identification information in the first update file and the network device. After the verification succeeds, it is determined that the first update file is a file that takes effect for the network device, and the method 500 is implemented based on the first update file, to complete the secure boot of the network device.

In some possible implementations, the first update file may further include third indication information and fourth indication information, where the third indication information uniquely identifies the first cryptographic algorithm, and the fourth indication information indicates to suspend use of the first cryptographic algorithm. Use of the first cryptographic algorithm is suspended based on the third indication information and the fourth indication information. An execution occasion for suspending use of the first cryptographic algorithm may be, for example, after the first cryptographic algorithm used for secure boot is updated to the second cryptographic algorithm.

In some other possible implementations, after the network device performs secure boot based on the second cryptographic algorithm and the second public key, the method 500 may further include: obtaining third indication information and fourth indication information, where the third indication information uniquely identifies the first cryptographic algorithm, and the fourth indication information indicates to suspend use of the first cryptographic algorithm. For example, the third indication information and the fourth indication information may be carried in a second update file. In this case, the obtaining third indication information and fourth indication information may be obtaining the third indication information and the fourth indication information from the second update file. In this way, the network device may suspend use of the first cryptographic algorithm based on the third indication information and the fourth indication information. An execution occasion on which the network device suspends use of the first cryptographic algorithm may be, for example, after the first cryptographic algorithm used for secure boot is updated to the second cryptographic algorithm.

Suspending use of the first cryptographic algorithm may include: disabling the first cryptographic algorithm or revoking the first cryptographic algorithm. For example, the disabling the first cryptographic algorithm may include, setting the usage status of the first cryptographic algorithm to a disabled state; and for example, the revoking the first cryptographic algorithm may include: setting the usage status of the first cryptographic algorithm to a revoked state. For example, the setting the usage status of the first cryptographic algorithm to a revoked state may be specifically: setting revocation identification information corresponding to the first cryptographic algorithm to indicate that the usage status of the first cryptographic algorithm is the revoked state.

For example, the method 500 may further include: obtaining the first update file, where the first update file indicates to enable the second cryptographic algorithm. For example, the method 500 may further include: obtaining the second update file, where the second update file indicates to revoke the first cryptographic algorithm. In this case, for example, S501 may include: enabling the second cryptographic algorithm based on the first update file; and revoking the first cryptographic algorithm based on the second update file. In this way, the cryptographic algorithm used for secure boot of the network device is flexibly adjusted, and the security of the network device is improved.

It can be learned that according to the method 500 provided in this embodiment of this application, once a currently used cryptographic algorithm cannot satisfy a security requirement or a user requirement, the network device updates the cryptographic algorithm used for secure boot and a corresponding public key baseline value online, to enable a cryptographic algorithm that satisfies the requirement. In this way, the newly enabled cryptographic algorithm is conveniently and flexibly enabled, and secure boot is performed on the network device by using the newly enabled cryptographic algorithm without recalling the network device or a chip in the network device, so that secure boot satisfies a changed security requirement, and different cryptographic algorithms are adjusted online based on different requirements to perform secure boot based on a cryptographic algorithm that satisfies a requirement. Therefore, security of the network device is improved.

It should be noted that, according to the method 500 in this embodiment of this application, for a specific implementation and an achieved effect, refer to related descriptions in the embodiment shown in FIG. 9.

Figure 12:
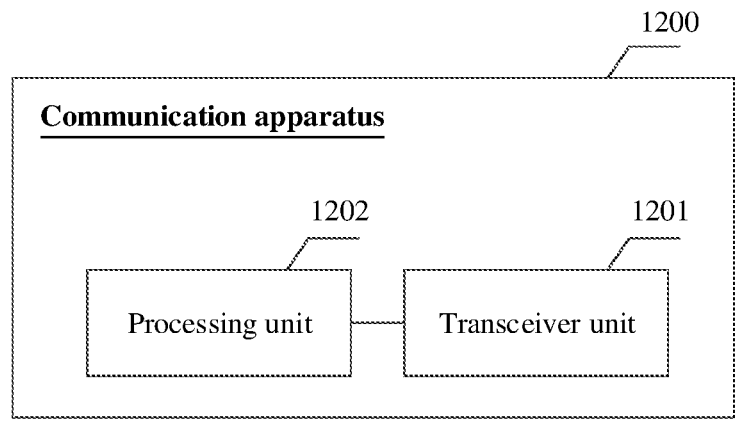
FIG. 12 is a schematic diagram of a structure of a communication apparatus 1200 according to an embodiment of this application.

Correspondingly, an embodiment of this application further provides a communication apparatus 1200, as shown in FIG. 12. The communication apparatus 1200 includes a transceiver unit 1201 and a processing unit 1202. The transceiver unit 1201 is configured to perform receiving and sending operations implemented by the network device in any one of the embodiments shown in the method 100 to the method 500. The processing unit 1202 is configured to perform an operation other than the receiving and sending operations implemented by the network device in any one of the embodiments shown in the method 100 to the method 500. For example, when the communication apparatus 1200 performs the method implemented by the network device in the method 100, the transceiver unit 1201 may be configured to obtain indication information 1 and indication information 2, and the processing unit 1202 may be configured to update, based on the indication information 1 and the indication information 2, cryptographic resource baseline information 1 corresponding to the cryptographic algorithm 1. For another example, when the communication apparatus 1200 performs the method implemented by the network device in the method 300, the transceiver unit 1201 may be configured to obtain indication information 1 and indication information 2, or the transceiver unit 1201 may be configured to obtain indication information 3 and indication information 4; the processing unit 1202 may be configured to update a cryptographic algorithm 2 used for secure boot to a cryptographic algorithm 1, or the processing unit 1202 may be configured to update a public key baseline value a used for secure boot to a public key baseline value b, or the processing unit 1202 may be configured to verify integrity of a public key B by using the public key baseline value b.

Figure 13:
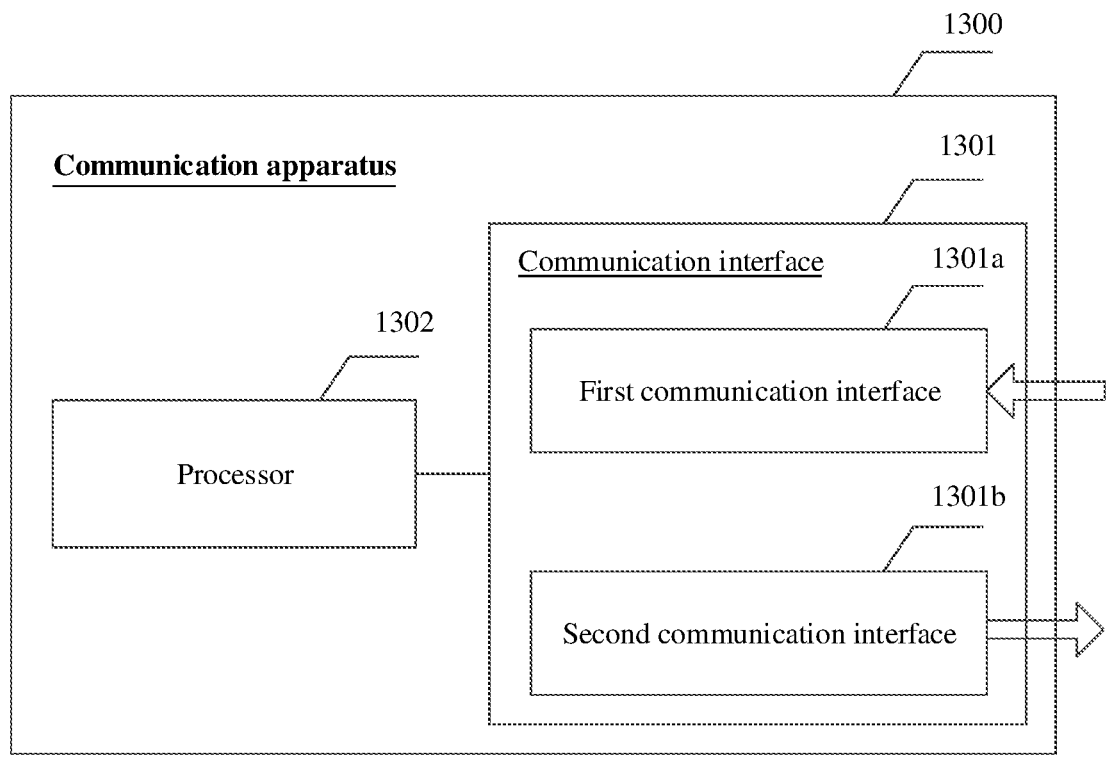
FIG. 13 is a schematic diagram of a structure of a communication apparatus 1300 according to an embodiment of this application.

In addition, an embodiment of this application further provides a communication apparatus 1300, as shown in FIG. 13. The communication apparatus 1300 includes a communication interface 1301 and a processor 1302. The communication interface 1301 includes a first communication interface 1301*a* and a second communication interface 1301*b*. The first communication interface 1301*a* is configured to perform a receiving operation performed by the network device in any one of the embodiments shown in the method 100 to the method 500. The second communication interface 13*o*1*b* is configured to perform a sending operation performed by the network device in any one of the embodiments shown in the method 100 to the method 500. The processor 1302 is configured to perform an operation other than the receiving operation and the sending operation performed by the network device in any one of the embodiments shown in the method 100 to the method 500. For example, the processor 1302 may perform an operation in the embodiment of the method 100: updating, based on the indication information 1 and the indication information 2, cryptographic resource baseline information 1 corresponding to a cryptographic algorithm 1. For another example, the processor 1302 may perform the operations in the embodiment of the method 300: updating a cryptographic algorithm 2 used for secure boot to a cryptographic algorithm 1, updating a public key baseline value a used for secure boot to a public key baseline value b, and verifying integrity of a public key B by using the public key baseline value b.

Figure 14:
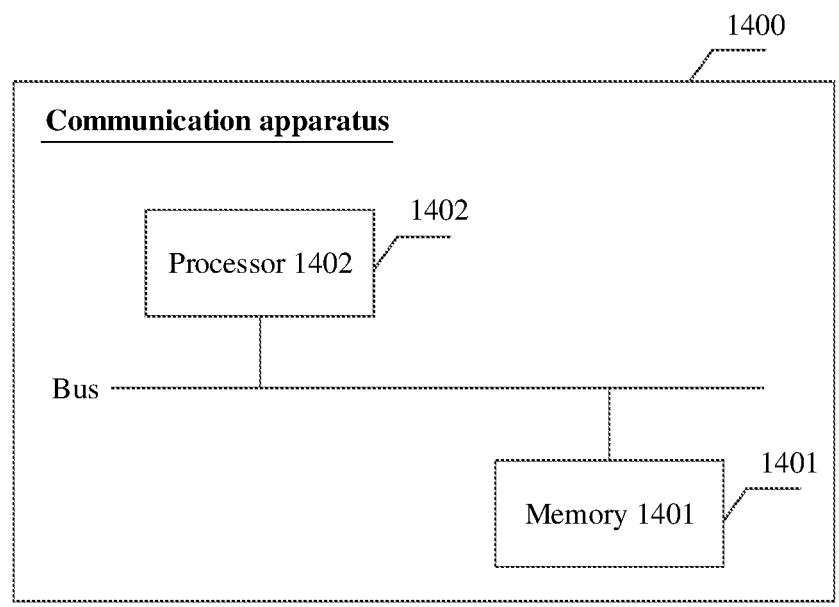
FIG. 14 is a schematic diagram of a structure of a communication apparatus 1400 according to an embodiment of this application.

In addition, an embodiment of this application further provides a communication apparatus 1400, as shown in FIG. 14. The communication apparatus 1400 includes a memory 1401 and a processor 1402 that communicates with the memory 1401. The memory 1401 includes computer-readable instructions. The processor 1402 is configured to execute the computer-readable instructions, so that the communication apparatus 1400 performs the method performed by the network device in any one of the embodiments shown in the method 100 to the method 500.

It may be understood that, in the foregoing embodiment, the processor may be a central processing unit (CPU), a network processor (NP), or a combination of the CPU and the NP. Alternatively, the processor may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof. The processor may be one processor, or may include a plurality of processors. The memory may include a volatile memory, for example, a random-access memory (RAM); the memory may further include a non-volatile memory (non-volatile memory), for example, a read-only memory (ROM), a flash memory, a hard disk drive (HDD), or a solid-state drive (SSD). The memory may further include a combination of the foregoing memories. The memory may be one memory, or may include a plurality of memories. In a specific implementation, the memory stores computer-readable instructions, and the computer-readable instructions include a plurality of software modules, for example, a sending module, a processing module, and a receiving module. After executing each software module, the processor may perform a corresponding operation based on an indication of each software module. In this embodiment, an operation performed by a software module is actually an operation performed by the processor based on an indication of the software module. After executing the computer-readable instructions in the memory, the processor may perform, based on indications of the computer-readable instructions, all operations that may be performed by the network device.

It may be understood that, in the foregoing embodiment, the communication interface 1301 of the communication apparatus 1300 may be specifically used as the transceiver unit 1201 in the communication apparatus 1200, to implement communication between the communication apparatus and another device.

Figure 15A:
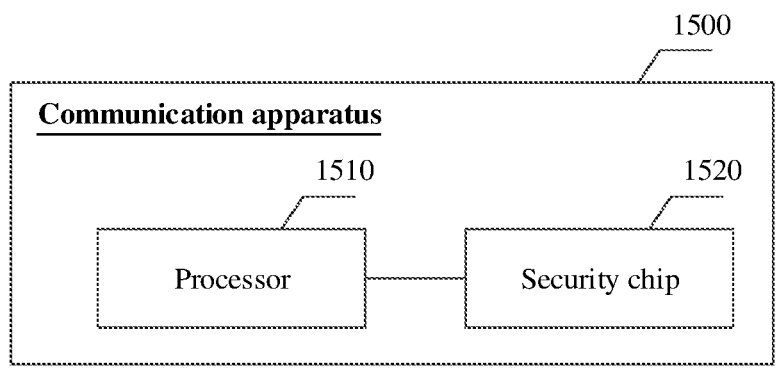
FIG. 15A is a schematic diagram of a structure of a communication apparatus 1500 according to an embodiment of this application.
Figure 15B:
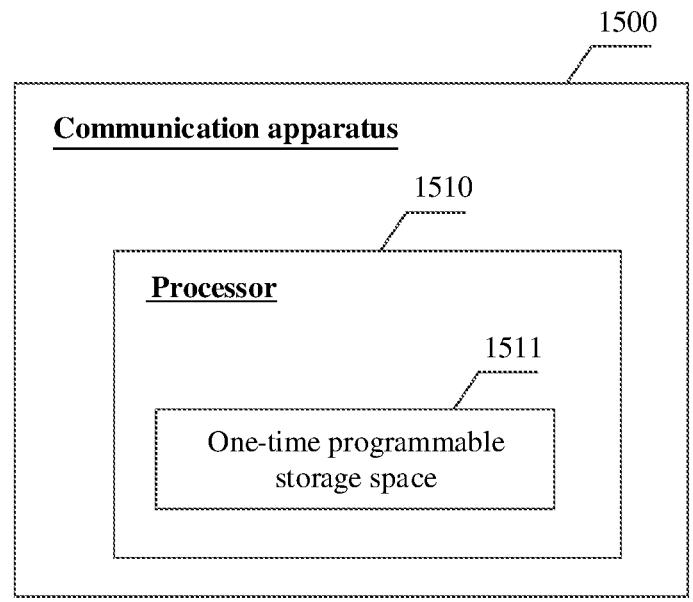
FIG. 15B is a schematic diagram of a structure of a communication apparatus 1500 according to an embodiment of this application.

It should be noted that an embodiment of this application further provides a communication apparatus 1500. The communication apparatus 1500 includes a processor 1510. The processor 1510 is configured to perform operations performed by the network device in any one of the embodiments shown in the method 100 to the method 500. For example, the processor 1510 may be the processing unit 1202 in the communication apparatus 1200, the processor 1302 in the communication apparatus 1300, or the processor 1402 in the communication apparatus 1400. For example, as shown in FIG. 15A, the communication apparatus 1500 may include a processor 1510 and a security chip 1520. The security chip 1520 is connected to the processor 1510. The security chip 1520 is configured to store a plurality of types of cryptographic resource baseline information. The plurality of types of cryptographic resource baseline information correspond one-to-one to a plurality of cryptographic algorithms, and the plurality of cryptographic algorithms are all applicable to secure boot. For another example, as shown in FIG. 15B, the communication apparatus 1500 includes a processor 1510. The processor 1510 includes one-time programmable storage space 1511. The one-time programmable storage space 1511 is used to store a plurality of types of cryptographic resource baseline information. The plurality of types of cryptographic resource baseline information correspond one-to-one to a plurality of cryptographic algorithms, and the plurality of cryptographic algorithms are all applicable to secure boot. For example, the plurality of cryptographic algorithms include any two or more of the following cryptographic algorithms: an asymmetric cryptographic algorithm RSA, an elliptic curve cryptography ECC algorithm, an asymmetric cryptographic algorithm SM2, a secure hash algorithm SHA, or a cryptographic hash algorithm SM3.

Figure 16:
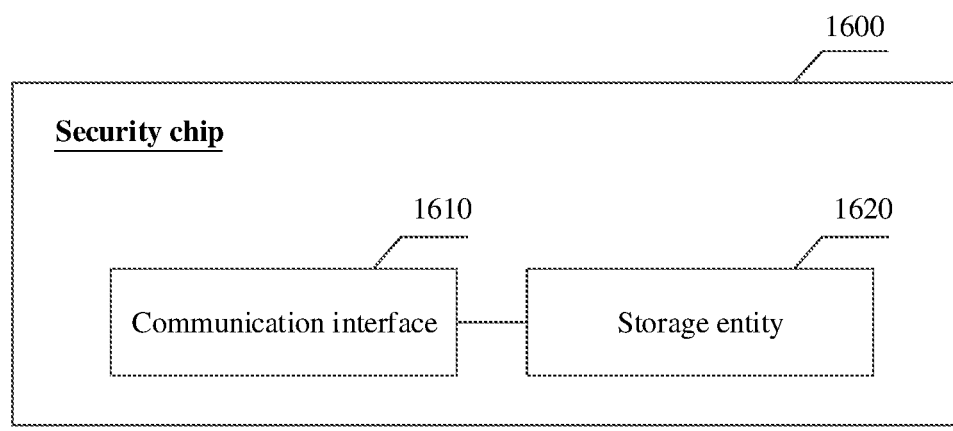
FIG. 16 is a schematic diagram of a structure of a security chip 1600 according to an embodiment of this application.

In addition, an embodiment of this application further provides a security chip 1600, as shown in FIG. 16. The security chip 1600 includes a communication interface 161o and a storage entity 1620. The storage entity 1620 stores a plurality of types of cryptographic resource baseline information, a plurality of cryptographic resources respectively correspond to cryptographic algorithm information and key information that need to be used by a network device in a plurality of secure boot processes, each type of cryptographic resource baseline information corresponds one-to-one to each time of secure boot, and each type of cryptographic resource baseline information is used to perform integrity verification on a cryptographic resource used in each time of secure boot. The plurality of types of cryptographic resource baseline information include first cryptographic resource baseline information and second cryptographic resource baseline information. The first cryptographic resource baseline information is used to perform integrity verification on a first cryptographic resource used by the network device when the network device performs first secure boot, the first cryptographic resource corresponds to a first cryptographic algorithm and a first public key, the first cryptographic resource baseline information includes status information of the first cryptographic algorithm, and the status information of the first cryptographic algorithm indicates a usage status of the first cryptographic algorithm. The second cryptographic resource baseline information is used to perform integrity verification on a second cryptographic resource used by the network device when the network device performs second secure boot, the second cryptographic resource corresponds to a second cryptographic algorithm and a second public key, the second cryptographic resource baseline information includes status information of the second cryptographic algorithm, the status information of the second cryptographic algorithm indicates a usage status of the second cryptographic algorithm, the second secure boot is secure boot performed by the network device after the network device performs the first secure boot, and the first cryptographic algorithm is different from the second cryptographic algorithm.

The security chip 1600 communicates with a processor through the communication interface 1610, and the processor is configured to manage the plurality of types of cryptographic resource baseline information stored in the security chip 1600. For example, the processor may be the processing unit 1202 in the communication apparatus 1200, the processor 1602 in the security chip 1600, the processor 1402 in the communication apparatus 1400, or the processor 1510 in the communication apparatus 1500. The first cryptographic resource baseline information includes a first public key baseline value, and the first public key baseline value is used to verify integrity of the first public key; and the second cryptographic resource baseline information includes a second public key baseline value, and the second public key baseline value is used to verify integrity of the second public key.

It should be noted that the security chip 1600 may be, for example, the security chip 1520 in the communication apparatus 1500 shown in FIG. 15A.

It should be noted that the first cryptographic algorithm includes any two or more of the following cryptographic algorithms: an asymmetric cryptographic algorithm RSA, an elliptic curve cryptography ECC algorithm, a Chinese cryptographic asymmetric cryptographic algorithm SM2, a secure hash algorithm SHA, or a cryptographic hash algorithm SM3. The second cryptographic algorithm includes any two or more of the following cryptographic algorithms: an asymmetric cryptographic algorithm RSA, an elliptic curve cryptography ECC algorithm, an asymmetric cryptographic algorithm SM2, a secure hash algorithm SHA, or a cryptographic hash algorithm SM3.

The status information of the first cryptographic algorithm may include first suspension identification information. The first suspension identification information may include revocation identification information and/or disabling identification information. The status information of the first cryptographic algorithm may alternatively include first enabling identification information. Similarly, the status information of the second cryptographic algorithm may include second suspension identification information. The second suspension identification information may include revocation identification information and/or disabling identification information. The status information of the second cryptographic algorithm may alternatively include second enabling identification information.

In addition, an embodiment of this application further provides a computer-readable storage medium. The computer-readable storage medium stores instructions. When the instructions are run on a computer, the computer is enabled to perform the method performed by the network device in any one of the embodiments shown in the method 100 to the method 500.

In addition, an embodiment of this application further provides a computer program product, including a computer program or computer-readable instructions. When the computer program runs or the computer-readable instructions run on a computer, the computer is enabled to perform the method performed by the network device in any one of the embodiments shown in the method 100 to the method 500.

From the foregoing descriptions of the implementations, a person skilled in the art may clearly understand that some or all steps of the methods in embodiments may be implemented by software in addition to a universal hardware platform. Based on such an understanding, the technical solutions of this application may be implemented in a form of a software product. The computer software product may be stored in a storage medium, for example, a read-only memory (English: read-only memory, ROM)/RAM, a magnetic disk, or an optical disc, and include several pieces of program code or several instructions for instructing a computer device (which may be a personal computer, a server, or a network communications device such as a router) to perform the methods described in the embodiments or some parts of the embodiments of this application.

Embodiments in this specification are all described in a progressive manner, for same or similar parts in embodiments, refer to these embodiments, and each embodiment focuses on a difference from other embodiments. Especially, apparatus and device embodiments are basically similar to the method embodiments, and therefore are described briefly. For related parts, refer to partial descriptions in the method embodiments. The described device and apparatus embodiments are merely examples. The modules described as separate parts may or may not be physically separate, and parts displayed as modules may or may not be physical modules, may be located at one position, or may be distributed on a plurality of network units. Some or all the modules may be selected based on actual requirements to achieve the objectives of the solutions of the embodiments. A person of ordinary skill in the art may understand and implement embodiments of the present invention without creative efforts.

The foregoing descriptions are merely example implementations of this application, but are not intended to limit the protection scope of this application. It should be noted that a person of ordinary skill in the art may make some improvements and polishing without departing from this application and the improvements and polishing shall fall within the protection scope of this application.

What is claimed is:

1. A method, wherein the method is applied to a network device, and the method comprises:
   obtaining first indication information and second indication information, wherein the first indication information uniquely identifies a first cryptographic algorithm, the second indication information instructs the network device to update first cryptographic resource baseline information stored in a secure storage entity, the first cryptographic resource baseline information is configured to be used to perform integrity verification on a first cryptographic resource used by the network device in a secure boot process, the first cryptographic resource corresponds to the first cryptographic algorithm and a first public key, the first cryptographic algorithm and the first public key are used by the network device when the network device performs secure boot, the first cryptographic resource baseline information comprises status information of the first cryptographic algorithm, and the status information of the first cryptographic algorithm indicates a usage status of the first cryptographic algorithm; and
   updating the first cryptographic resource baseline information based on the first indication information and the second indication information, to obtain updated first cryptographic resource baseline information.

2. The method according to claim 1, wherein the updated first cryptographic resource baseline information comprises a first public key baseline value, and the first public key baseline value is configured to be used to perform integrity verification on the first public key.

3. The method according to claim 2, wherein updating the first cryptographic resource baseline information comprises:
   obtaining the first public key baseline value, and storing the first public key baseline value in the secure storage entity.

4. The method according to claim 2, wherein the first public key baseline value is preset in the secure storage entity.

5. The method according to claim 2, wherein after updating the first cryptographic resource baseline information, the method further comprises:
performing secure boot based on the updated first cryptographic resource baseline information and the first cryptographic resource.

6. The method according to claim 5, wherein before performing the secure boot, the method further comprises:
updating a second cryptographic resource stored in a nonvolatile memory to the first cryptographic resource.

7. The method according to claim 1, wherein obtaining the first indication information and the second indication information comprises:
obtaining a first update file, wherein the first update file carries the first indication information and the second indication information.

8. The method according to claim 7, wherein the first update file is a certificate.

9. The method according to claim 7, wherein the first update file further carries device identification information of the network device, and the device identification information identifies the network device.

10. The method according to claim 1, wherein the secure storage entity further stores second cryptographic resource baseline information, the second cryptographic resource baseline information is configured to be used to perform integrity verification on a second cryptographic resource used by the network device in the secure boot process, and the second cryptographic resource corresponds to a second cryptographic algorithm and a second public key;
wherein before performing secure boot by using the first cryptographic resource, the network device performs secure boot by using the second cryptographic resource; and the method further comprises:
obtaining third indication information and fourth indication information, wherein the third indication information uniquely identifies the second cryptographic algorithm, and the fourth indication information indicates to suspend use of the second cryptographic algorithm.

11. The method according to claim 10, wherein obtaining the third indication information and fourth indication information comprises:
obtaining a second update file, wherein the second update file carries the third indication information and the fourth indication information.

12. The method according to claim 10, further comprising:
suspending use of the second cryptographic algorithm based on the third indication information and the fourth indication information.

13. The method according to claim 10, wherein the second cryptographic algorithm is any one of the following cryptographic algorithms:
an asymmetric cryptographic algorithm (RSA), an elliptic curve cryptography (ECC) algorithm, a Chinese cryptographic asymmetric cryptographic algorithm (SM2), a secure hash algorithm (SHA), or a cryptographic hash algorithm (SM3); and
wherein the first cryptographic algorithm and the second cryptographic algorithm are different cryptographic algorithms.

14. The method according to claim 10, wherein the second indication information instructs the network device to suspend use of the first cryptographic algorithm.

15. The method according to claim 10, wherein the secure storage entity is one-time programmable storage space in a processor or a security chip independent of the processor.

16. An apparatus, comprising:
a non-transitory memory, wherein the memory stores computer-readable instructions; and
a processor that communicates with the memory, wherein the computer-readable instructions are executable by the processor to enable the apparatus to:
obtain first indication information and second indication information, wherein the first indication information uniquely identifies a first cryptographic algorithm, the second indication information instructs a network device to update first cryptographic resource baseline information stored in a secure storage entity, the first cryptographic resource baseline information is configured to be used to perform integrity verification on a first cryptographic resource used by the network device in a secure boot process, the first cryptographic resource corresponds to the first cryptographic algorithm and a first public key, the first cryptographic algorithm and the first public key are used by the network device when the network device performs secure boot, the first cryptographic resource baseline information comprises status information of the first cryptographic algorithm, and the status information of the first cryptographic algorithm indicates a usage status of the first cryptographic algorithm; and
update the first cryptographic resource baseline information based on the first indication information and the second indication information.

17. The apparatus according to claim 16, comprising a security chip independent of the processor, wherein the security chip is connected to the processor, and the security chip stores the first cryptographic resource baseline information.

18. The apparatus according to claim 16, wherein the processor comprises one-time programmable storage space, and the one-time programmable storage space stores the first cryptographic resource baseline information.

19. The apparatus according to claim 16, wherein the computer-readable instructions are executable by the processor to enable the apparatus to:
obtain a first update file, wherein the first update file carries the first indication information and the second indication information.

20. A non-transitory computer-readable storage medium, storing a program or instructions, wherein when the program runs or the instructions are run on a processor, the following operations are implemented:
obtaining first indication information and second indication information, wherein the first indication information uniquely identifies a first cryptographic algorithm, the second indication information instructs a network device to update first cryptographic resource baseline information stored in a secure storage entity, the first cryptographic resource baseline information is configured to be used to perform integrity verification on a first cryptographic resource used by the network device in a secure boot process, the first cryptographic resource corresponds to the first cryptographic algorithm and a first public key, the first cryptographic algorithm and the first public key are used by the network device when the network device performs secure boot, the first cryptographic resource baseline information comprises status information of the first cryptographic algorithm, and the status information of the first cryptographic algorithm indicates a usage status of the first cryptographic algorithm; and updating the first cryptographic resource baseline information based on the first indication information and the second indication information.

* * * * *